United States Patent
Carr et al.

(10) Patent No.: US 12,081,638 B2
(45) Date of Patent: Sep. 3, 2024

(54) SYSTEM AND METHOD FOR TENANT SPECIFIC DATA MODELING FOR FIELD VERSIONING AND DOMAIN INTERCONNECTION

(71) Applicant: CS Disco, Inc., Austin, TX (US)

(72) Inventors: Brian M. Carr, Austin, TX (US); James D. Snyder, Cedar Park, TX (US); Robert J. Macaulay, Austin, TX (US)

(73) Assignee: CS DISCO, INC., Austin, TX (US)

( * ) Notice: Subject to any disclaimer, the term of this patent is extended or adjusted under 35 U.S.C. 154(b) by 0 days.

(21) Appl. No.: 18/483,350

(22) Filed: Oct. 9, 2023

(65) Prior Publication Data
US 2024/0040016 A1    Feb. 1, 2024

Related U.S. Application Data

(63) Continuation of application No. 18/082,696, filed on Dec. 16, 2022, now Pat. No. 11,818,232.

(60) Provisional application No. 63/291,747, filed on Dec. 20, 2021.

(51) Int. Cl.
*H04L 67/63*     (2022.01)
*G06F 8/65*      (2018.01)
*H04L 67/10*     (2022.01)

(52) U.S. Cl.
CPC ............... *H04L 67/63* (2022.05); *G06F 8/65* (2013.01); *H04L 67/10* (2013.01)

(58) Field of Classification Search
None
See application file for complete search history.

(56) References Cited

U.S. PATENT DOCUMENTS

| | | | |
|---|---|---|---|
| 11,641,665 B2 * | 5/2023 | Helms .................. | H04L 67/535 370/329 |
| 11,882,117 B1 * | 1/2024 | Kumar ................ | H04L 63/0876 |
| 2020/0065080 A1 * | 2/2020 | Myneni ............... | H04L 63/1408 |
| 2020/0065166 A1 * | 2/2020 | Myneni ................. | G06F 9/5061 |

\* cited by examiner

*Primary Examiner* — Quang N Nguyen
(74) *Attorney, Agent, or Firm* — Sprinkle IP Law Group

(57) ABSTRACT

Systems and methods for data modeling in multi-tenant systems are disclosed. Embodiments allow the customization of data models for data types (e.g., such as documents or the like) through the addition of fields to data models for data types for particular tenants without modification to components of the system by allowing the definition of a data type and its associated fields for each tenant and externalizing the definition of those data types. This metamodel can thus enable the fields of a data type for a particular tenant to be independently modified or updated for that tenant and data type. The data type for an individual tenant at any given point in time can thus be defined by the set of fields (e.g., and field versions) associated with that data type as defined for that tenant in the metamodel at that point in time.

21 Claims, 16 Drawing Sheets

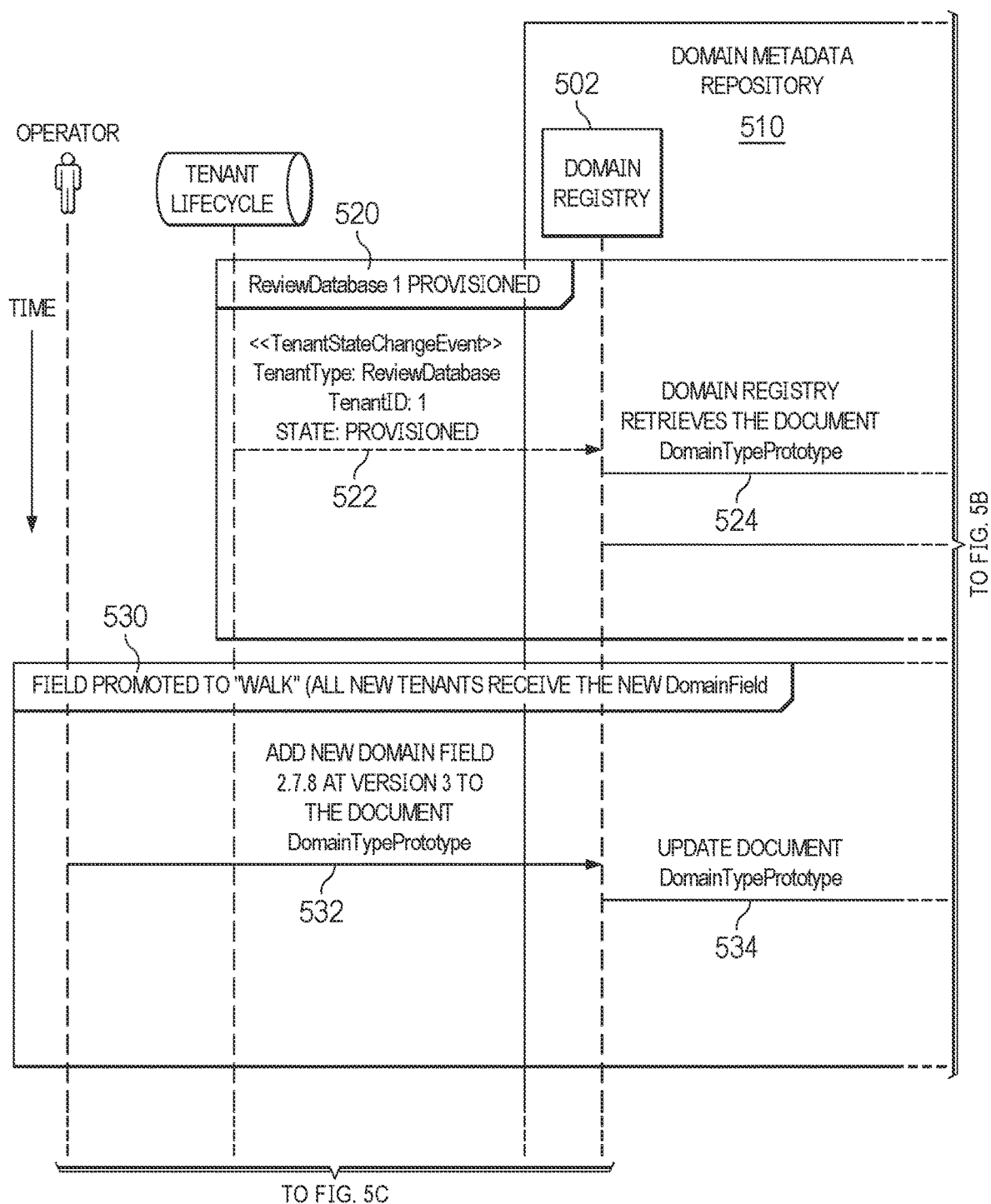

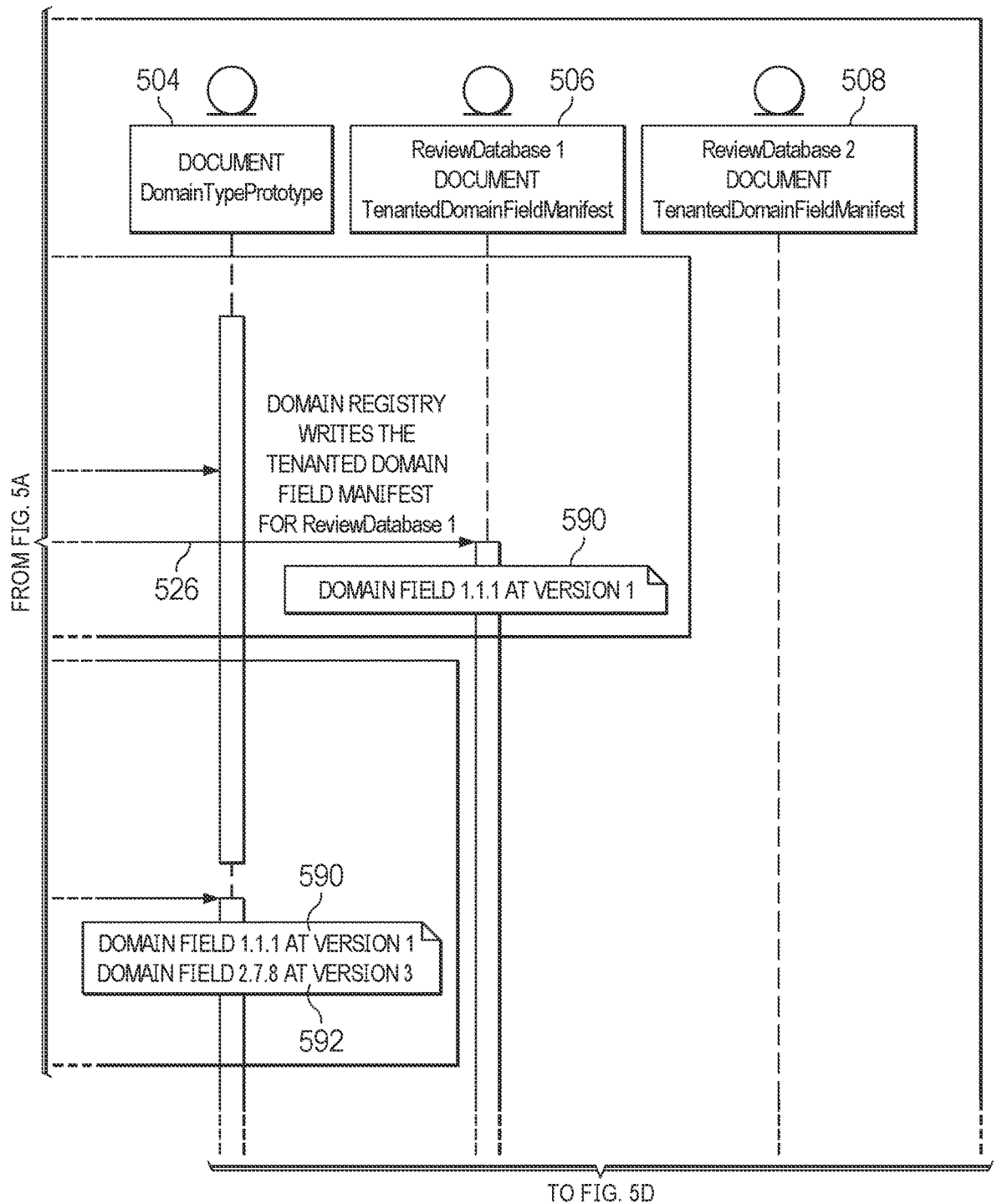

SYSTEM AND METHOD FOR TENANT SPECIFIC DATA MODELING FOR FIELD VERSIONING AND DOMAIN INTERCONNECTION

RELATED APPLICATIONS

This application is a continuation of, and claims a benefit of priority under 35 U.S.C. 120 of the filing date of U.S. patent application Ser. No. 18/082,696, filed Dec. 16, 2022, now U.S. Pat. No. 11,818,232, entitled "SYSTEM AND METHOD FOR TENANT SPECIFIC DATA MODELING FOR FIELD VERSIONING AND DOMAIN INTERCONNECTION," which claims the benefit of priority under 35 U.S.C. § 119 to U.S. Provisional Application No. 63/291,747 filed Dec. 20, 2021, entitled "FIELD VERSIONING AND DOMAIN INTERCONNECTION," the entire contents of which are hereby expressly incorporated by reference for all purposes.

TECHNICAL FIELD

This disclosure relates generally to modeling and managing abstract types in distributed computing systems. In particular, this disclosure relates to data modeling of abstract types across tenants in a multi-tenant distributed computing environment. Even more specifically, this disclosure relates to the architecture, manipulation, and use, of data models for abstract types in a federated multi-tenant environment to allow dynamic tenant specific modeling of these abstract types, while allowing interoperability of federated applications or other consumers of instances of these abstract types across the different tenant specific models.

BACKGROUND

Many modern computing systems architectures have evolved to serve multiple tenants using federated or distributed systems. Thus, from a design and implementation standpoint it may be highly advantageous to have a concrete, fixed data model for modeling abstract data types within such systems. This is because each of the components (e.g., hardware or software, interfaces, protocols, etc.) that comprise such distributed systems may be required to interoperate with that data model. These components may be widely varied and highly distributed, including database systems, applications, (API) Application Programming Interfaces, services, communication systems, search languages, brokers, etc. Accordingly, each of these components is required to conform to, or otherwise utilize, the data model used to model a data type. Databases storing that data type must be configured to store data according to such a data model, interfaces that allow for interaction with instances of such a data type must allow for calls (requests) and responses that confirm to that data model, protocols must be configured to allow communications according to that data model, applications and services must be configured to obtain, process, manipulate or store data according to that data model, etc. By having a fixed data model, the ease of development and interoperation of components of a distributed system can be facilitated.

Such a static and fixed data model is, however, antithetical to the ideal desires of both the providers of these distributed systems and the tenants that utilized these systems. Tenants may desire a highly configurable system that allows them to tailor the representation of a data type (e.g., a document) in a manner that is most suitable for their use by adding attributes to (or altering existing attributes of) the data model of that data type. Providers not only wish to support such customization of data types in their system but additionally to be able to manage the progression of, and interaction with, these various attributes across the various data models and tenants that are included in the system.

Such desires have heretofore been largely unmet. If a data model for a data type changes it is typically the case that all components dependent on that data model must be modified as well. This is because these components are typically required to have a priori knowledge of the data model which is being used to model the data they are obtaining, processing, manipulating etc. In other words, the components are based on a particular data model or particular attributes of that data model; when the data model is altered, so too must the component be altered to conform to that new data model. As these components may be highly interdependent (e.g., may be coordinated via a service mesh of the like) but independently and asynchronously developed, maintained, updated, etc. by different entities (e.g., teams, developers, groups, etc.) of the providers of such a distributed system this is non-trivial task, both from the perspective of the alteration of the individual components to accommodate the revisions to a data model, but additionally because the alterations or release of these components may need to be coordinated such that the alteration to one component does not break or otherwise comprise the functionality of other components or the entire system.

Providers of such systems therefore wish to allow the modeling of data types that can be customized for tenants in a multi-tenant deployment by quickly and easily adding attributes to those data types without entailing a modification to all the components of that distributed system that depend on that data model, including components that conform to, or otherwise utilize, the data model used to model a data type.

SUMMARY

To continue with the above discussion, the architecture and deployment of many modern systems, especially with respect to the manner in which such systems model data, and the way such systems interact with each other and communicate data confirming to such models make these systems brittle. Specifically, the alteration of the data models (or components of the systems reliant on such data models) is extremely difficult, especially when such systems are operated in a multi-tenant environment. In can be understood then, that these difficulties arise in systems employed in a variety of contexts. For example, multi-tenant document analysis systems that processes electronically stored documents and allow users associated with multiple tenants to analyze, review, navigate or otherwise access or manipulate these documents may experience such issues with respect to the modeling of such these documents.

Specifically, these document analysis systems may have a myriad number of internal or external components (e.g., services or applications such as viewers, search services, etc.) that operate on those documents and thus rely on a data model employed by the document analysis system for documents and the associated fields for that document data model. Moreover, the tenants of such a document analysis system may desire to add or customize the fields used for a document (and thus the fields of the data model for a document) according to their own needs. Thus, providers of document analysis systems may experience acutely what is more generally desired amongst operators of multi-tenant systems. Namely, the ability to model a data type (e.g., documents) that can be customized for tenants by quickly and easily adding fields to that data type without entailing a modification to all the components of the document analysis system that depend on that data model.

It will be noted here that for purposes of ease of description of embodiments it is useful to have a concrete example of a system and data type to refer to and utilize in such descriptions. Thus, for ease of illustration and depiction herein, particular embodiments will be described with respect to a document analysis system which employs embodiments of data modeling as disclosed herein to model a data type for documents with fields without loss of generality. It will be understood however, that embodiments as described herein will be more generally applicable to almost any computing system in which data modeling is utilized and such embodiments are fully contemplated herein.

With that in mind, embodiments may allow the customization of data models for data types (e.g., documents) through the addition of fields to data models for data types for particular tenants without modification to components of the system by allowing the definition of a data type (e.g., a document data type) and its associated fields for each tenant and externalizing the definition of those data types. Thus, the data types and fields of those data types are represented externally (e.g., from the database in which instances of such data types are stored). This representation (referred to as a metamodel) of the data types and their fields (e.g., the externalized representation of the data types and their fields) can thus enable the fields of a data type for a particular tenant to be independently modified or updated for that tenant and data type. Additionally, the structure of the metamodel employed allows a versioning scheme to be utilized such that individual fields of a data type can be independently versioned. Thus, the fields used for a data type for a tenant may evolve over time, and the specific fields (or versions of fields) utilized for a particular data type for a particular tenant may be different at various points in time. The data type for an individual tenant at any given point in time can thus be defined by the set of fields (e.g., and field versions) associated with that data type as defined for that tenant in the metamodel at that point in time. This portion of the metamodel for a particular tenant is referred to as the tenant manifest.

In one embodiment, a data type prototype, which is itself malleable (i.e., may be dynamically altered over time), may be used as a basis for a data type. The data type prototype comprises a definition of a set of fields (e.g., and their associated versions) that should comprise the corresponding data type (e.g., a document). Accordingly, when a new tenant begins to utilize the system the data type prototype (e.g., for each data type) may be utilized as a starting point for that tenant by associating the fields of the data type prototype with that data type for that tenant. Subsequently, the definition of that data type in the metamodel for that tenant may evolve over time as discussed.

The components of the system that interact with instances of these data types are thus adapted to utilize this metamodel for a data type for a tenant when processing instances of that data type for that tenant. According to embodiments then, components adapted for use with these metamodels can first obtain the metamodel of the data type for the tenant for a data type to be processed, and process the instance of the data type according to (e.g., the fields or versions) defined for that data type for that tenant.

To facilitate the interoperation of these components with the metamodel, embodiments may provide for a centralized service that is used (e.g., by components) to request data for data types and fields. This centralized service may allow a component (e.g., a viewer interface, search client or another front end service or application that interacts with the system) to introspect (e.g., obtain) data on that data type (e.g., fields available for that data type for that tenant) by interacting with the centralized service at the time the definition of such a data type is actually needed (e.g., when interacting with an instance of a data type). The component can then interact with the instance of that data type or perform other functionality (e.g., construct a display for a user, request data, etc.) based on the set of fields available for that data type for that tenant at that time.

In this manner, the definition of what a data type is (e.g., the fields that comprise a data type) is not hard coded or built into components of systems that utilize embodiments of such data modeling methods and systems, but is instead dynamically determined during runtime by components of the system, and, in fact, may be dynamically re-determined by each individual component of the system during the runtime as individual instances of the those data types are accessed, processed, manipulated etc. In this way, all component interactions based on data types or instances of data types are driven by the metamodel comprising the data type definitions for the tenants within the system without requiring these components to be adapted to a specific model for a data type.

Moreover, these interactions are based on definitions for the data type that exist in the metamodel at the point in time the component interacts with such a data type. Accordingly, as the component is adapted to utilize the metamodel no adaptation of the component is required to allow the component to interact with an updated definition of a data type. After an update to the metamodel occurs, the next time the component interacts with (e.g., an instance of) a data type for a tenant it will obtain the (updated) metamodel describing these new fields (or version of fields) and interact with the data type according to this updated definition. Similarly, many (e.g., thousands, hundreds of thousands, etc.) definitions for a data type may exist for a large number of tenants simultaneously in the system and the components are adapted to interact all instances of these data types for all tenants based on the use of the metamodel without alternation to the components of the system.

Accordingly, the architecture of embodiments of systems and methods for data modeling as disclosed herein may have a number of advantages. For example, this architecture may facilitate a controlled deployment of a field for a data type (or a version of a field for a domain type) in multiple phases if desired, and may facilitate this controlled deployment without having to modify other components of the systems such as the application or services that work with instances of that domain type. In one phase (referred to as the crawl phase), a field (e.g., or versions for fields) for a data type may be added directly to the tenant manifest of (one or more) individual existing tenants. By adding the field to only tenant manifests for those individual tenants the system ensures that the field (or version of field) is only utilized for instances of that data type associated with those tenants going forward.

In a second phase (referred to as the walk phase) a field (e.g., or versions for fields) may be added or included in the model for a data type for all new tenants that utilize the system by including that field in the data type prototype for that data type. Thus, from that point forward (i.e., after the field is added to the data type prototype) when each new tenant begins to utilize the system from that point forward, the tenant manifest created for that new tenant will be based on the data type prototype including that field. As a result, the data type definition for that data type in the tenant manifest for that new tenant will include the field deployed in the walk phase, and instances of that data type may be processed accordingly by the components of the system.

In the third phase (referred to as the run phase), a field may be added directly to the tenant manifests of all the existing tenants (and added to the data type prototype for the data type if the field was not promoted to the walk phase previously). Thus, the run phase may be undertaken similarly to the crawl phase except the group (cohort) of tenants whose associated manifests are modified to include the field may encompass the entirety of the tenants utilizing the system at that time. Here, that domain type definition (and instances of that domain type) for all tenants may include that field from that point forward and may be processed accordingly by components of the system.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions, or rearrangements may be made within the scope of the invention, and the invention includes all such substitutions, modifications, additions, or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

FIGS. 5A, 5B, 5C and 5D (collectively FIG. 5) are diagrams depicting embodiments of the provisioning of tenants with domain types using a metamodel and a tenant manifest, and the associated deployment of fields for those domain types in a phased manner.

DETAILED DESCRIPTION

Figure 1A:
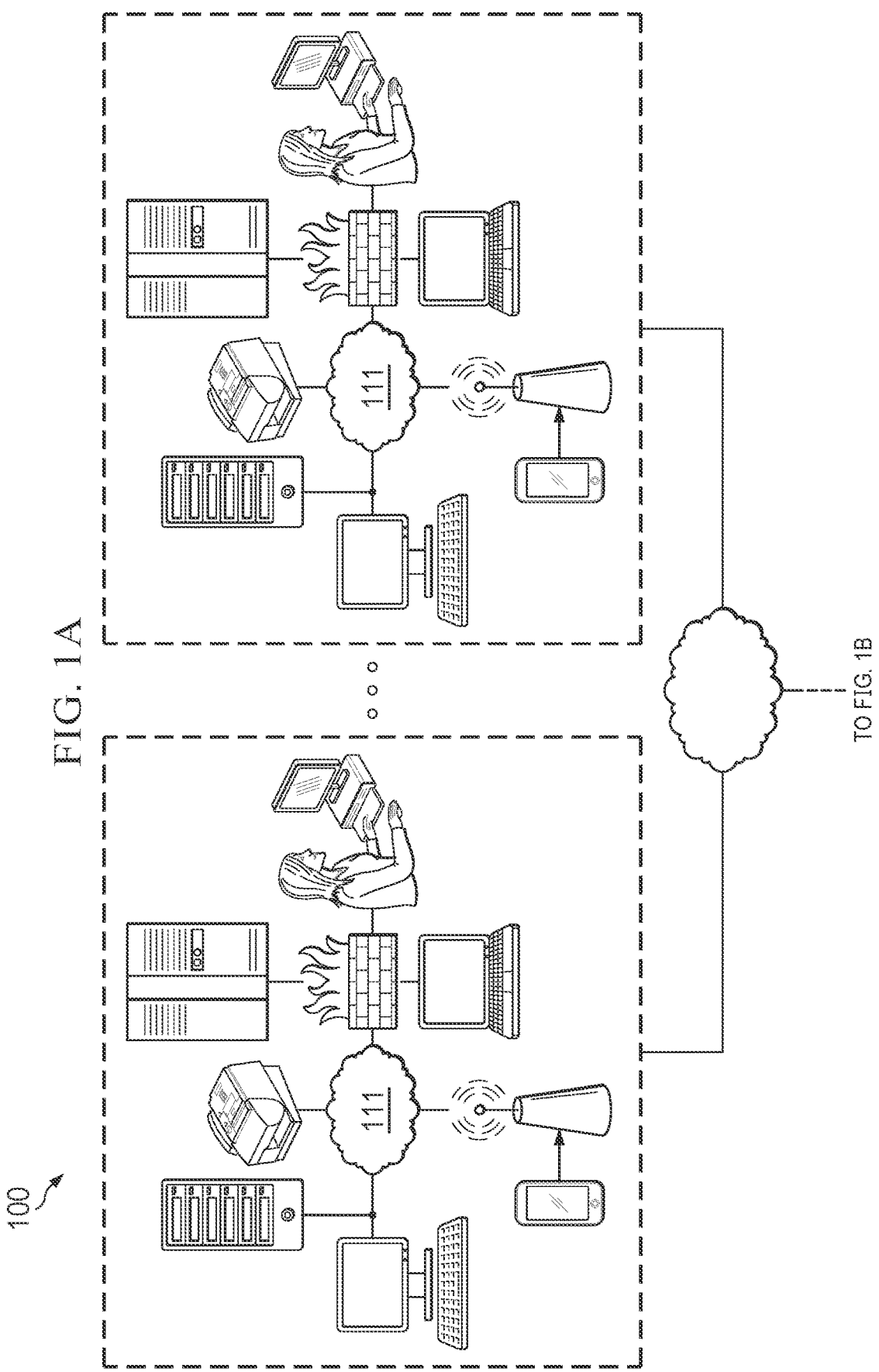
FIGS. 1A and 1B (collectively FIG. 1) are a block diagram of one embodiment of an architecture including a document analysis system employing an embodiment of data modeling using a metamodel.

The disclosure and various features and advantageous details thereof are explained more fully with reference to the exemplary, and therefore non-limiting, embodiments illustrated in the accompanying drawings and detailed in the following description. It should be understood, however, that the detailed description and specific examples, while indicating the preferred embodiments, are given by way of illustration only and not by way of limitation. Descriptions of known programming techniques, computer software, hardware, operating platforms, and protocols may be omitted so as not to unnecessarily obscure the disclosure in detail. Various substitutions, modifications, additions and/or rearrangements within the spirit and/or scope of the underlying inventive concept will become apparent to those skilled in the art from this disclosure.

Before describing embodiments in more detail, it may be helpful to discuss some context around multi-tenant systems that may employ embodiments of the systems and methods for data modeling and use of such data models as described. As mentioned above, multi-tenant document analysis systems that processes electronically stored documents and allow users associated with multiple tenants to analyze, review, navigate or otherwise access or manipulate these documents may experience issues with respect to the modeling of such these documents.

To illustrate in more detail, the vast majority of documents that are currently being created, utilized, and maintained are in electronic format. A number of different situations commonly arise that require an analysis or identification of certain relevant electronic documents from a relatively large pool of available electronic documents. For example, in litigation, an entity's documents may need to be reviewed in order to identify documents that may be relevant to one or more issues in the litigation.

To illustrate in more detail, parties to litigation typically have to share relevant evidence with opposing counsel through the discovery process. In many cases, each party makes a reasonable search of their records based on some set of terms or keywords and produces the results of the search to the other party. Discovery thus typically involves the gathering of potentially relevant materials, much of it digital, and then reviewing such materials to determine what to be shared with opposite parties. Additionally, during the course of the litigation each party may continually review those documents produced by the opposing party to locate documents relevant to the case at hand. Litigation thus represents a microcosm of a more general problem raised by the high volume of electronic documents present in a variety of contexts. Namely, how can a large volume of electronic documents be understood, reviewed, or searched in order that documents relevant to a particular topic or user's interest may be located.

To aid users in resolving these problems, a document analysis system may be provided in a given electronic context. A document analysis system is a computer system used to process a corpus of electronically stored information (referred to as the corpus) and allow users to analyze, review or navigate the information, or search the electronic information to return electronically stored information responsive to a search (also referred to as a query). Items of electronic information that form a corpus may be referred to interchangeably as (electronic) documents, items, files, objects, items, content, etc. and may include objects such as files of almost any type including documents for various editing applications, emails, workflows, etc.

These document analysis systems may have a myriad number of internal or external components (e.g., services or applications such as viewers, search services, etc.) that operate on those documents and thus rely on a data model employed by the document analysis system for documents and the associated fields for those documents. Moreover, the tenants of such a document analysis system may desire to add or customize the fields used for a document (and thus the fields of the data model for a document) according to their own needs. Thus, providers of document analysis systems may experience acutely what is more generally desired amongst operators of multi-tenant systems. Namely, the ability to model a data type (e.g., documents) that can be customized for tenants by quickly and easily adding fields to that data type without entailing a modification to all the components of the document analysis system that depend on that data model.

It will be noted again here that particular embodiments will be described with respect to a document analysis system which employs embodiments of data modeling as disclosed herein to model a data type for documents with fields without loss of generality and with the understanding that embodiments as described herein will be more generally applicable to almost any computing system in which data modeling is utilized and such embodiments are fully contemplated herein.

Figure 1B:
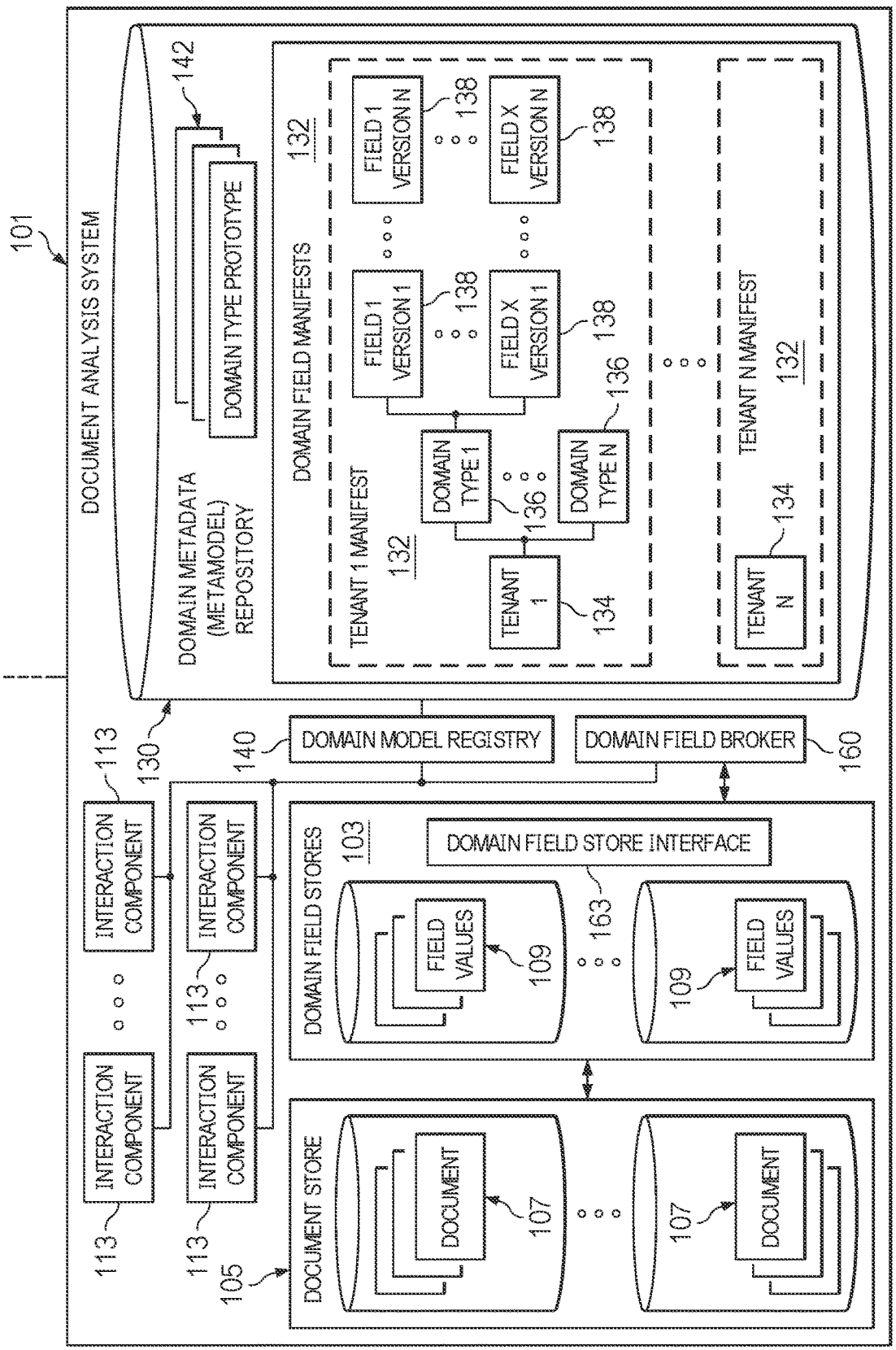

Looking now at FIG. 1, a block diagram of one embodiment of a document analysis system employing hierarchical clustering of document portions is depicted. Document analysis system 101 may include one or more (virtual or physical) servers or other type of computing device utilizing a central processing unit connected to a memory and one or more data stored. A central processing unit may represent a single processor, multiple processors, a processor(s) with multiple processing cores and the like. A data store may include a volatile or non-volatile non-transitory storage medium such as RAM, hard disk drives, flash memory devices, optical media, or the like. Document analysis system 101 may be connected to a data communications network such as the Internet, a local area network (LAN), a wide area network (WAN), a cellular network or some other network or combination of networks.

Document analysis system 101 and components thereof may be implemented on the same computing systems or can be distributed across multiple computing systems, platforms or physical or virtual servers. Similarly, the document analysis system 101 or components thereof may be implemented on a physical computing device or deployed as one or more services on, for example, a cloud computing environment or otherwise deployed without loss of generality.

The document analysis system 101 is part of a computing environment including the document analysis system 101 and one or more tenants 111. Specifically, the document analysis system 101 can be a multi-tenant document analysis system whereby the services or other functionality provided by the document analysis system 101 may be accessed by users associated with different tenants 111 (e.g., entities such as enterprises, organizations, etc.) to interact with data associated with those tenants 111. More generally, a tenant may be understood to mean any configuration or partitioning construct used by the document analysis system. Such a construct is usually utilized with an entity to facilitate interactions with a specific set of data for that entity. Each action of the document analysis system 101 may thus be undertaken with respect to, or associated with, a particular tenant. These tenants may be multi-faceted, and tenancy may have different effects for different components of the document analysis system 101. For example, an action taken by a user associated with a particular tenant 111 may have tenancy information tied to that user, a data set (e.g., database) which they are accessing or operating on, the organization to which that user belongs, etc.

Thus, document analysis system 101 is a multi-tenant platform that provides document analysis services to users from multiple (e.g., distinct) tenants 111, including allowing users of these tenants to access and review documents 107 and document data associated with that tenant 111. For example, in a litigation context such a tenant may be a law firm or other organization reviewing documents 107 associated with a third-party entity such as a party to litigation or a third-party entity subject to a subpoena.

To facilitate interaction with documents 107, the document analysis system 101 may include a number of components 113 that allow, or facilitate, interaction with domain types or instances of domain types such as documents 107 or document data by users of tenants 111. For purposes of this disclosure it will be understood that these components 113 may be almost any application or service, either external facing or internally utilized by document analysis system 101 that interacts with, or allows interaction with, domain types and domain type data such as the documents 107 or document data associated with those documents.

With that in mind, embodiments may allow the customization of data models for data types (e.g., documents) through the addition of fields to data models for data types for particular tenants without modification to components 113 of the system by allowing the definition of a data type (e.g., a document data type) and its associated fields for each tenant 111 and externalizing the definition of those data types. Thus, the data types and fields of those data types are represented externally (e.g., from the database such as document store 105, in which instances of such data types are stored). This representation (referred to as a metamodel) of the data types and their fields (e.g., the externalized representation of the data types and their fields) can thus enable the fields of a data type for a particular tenant 111 to be independently modified or updated for that tenant and data type. Additionally, the structure of the metamodel employed allows a versioning scheme to be utilized such that individual fields of a data type can be independently versioned. Thus, the fields used for a data type for a tenant may evolve over time, and the specific fields (or versions of fields) utilized for a particular data type for a particular tenant may be different at various points in time. The data type for an individual tenant at any given point in time can thus be defined by the set of fields (e.g., and field versions) associated with that data type as defined for that tenant in the metamodel at that point in time.

Figure 2:
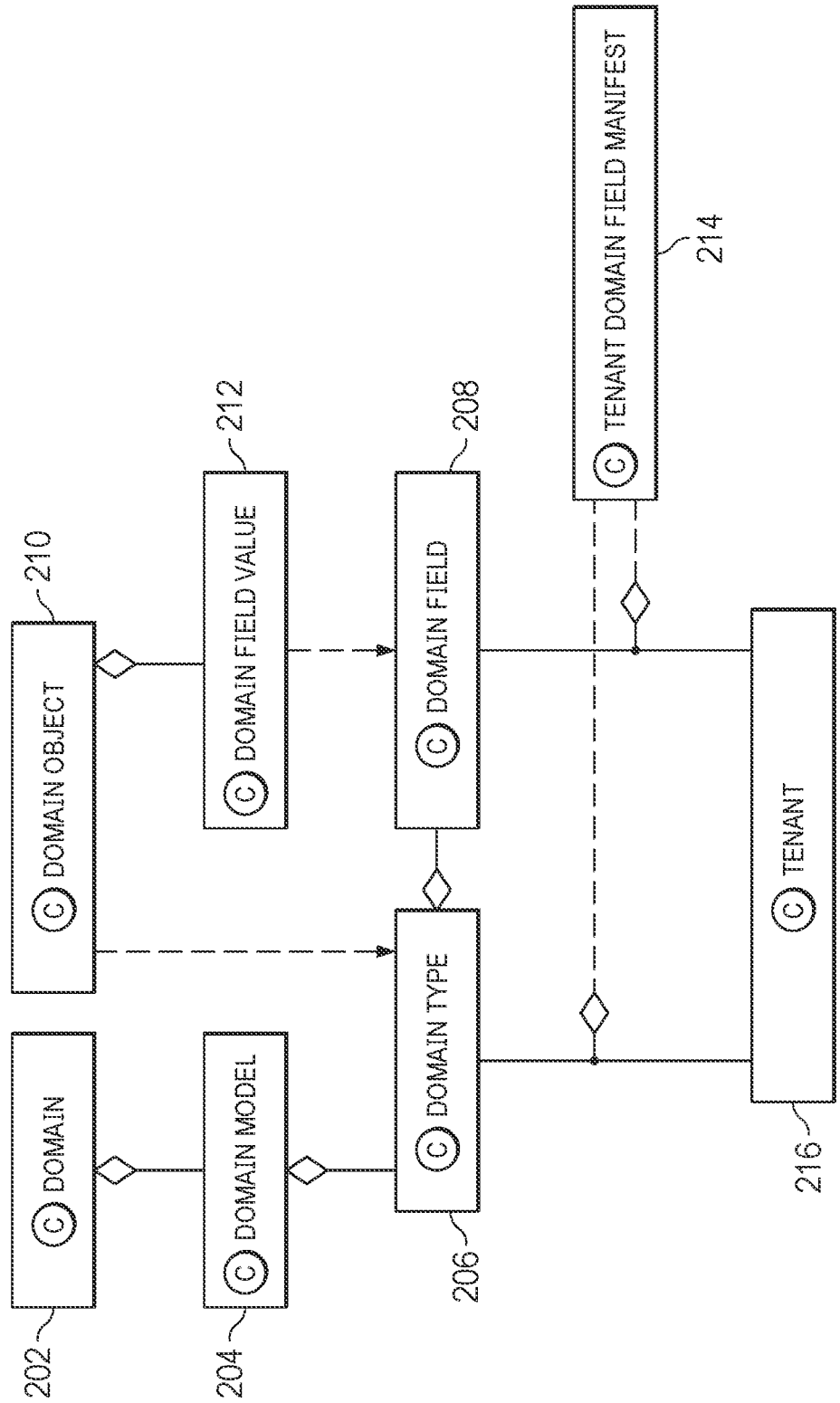
FIG. 2 is a block diagram depicting one embodiment of a metamodel.

Turning then briefly to FIG. 2, a depiction of one embodiment of a metamodel at least portions of which may be used as a data model is depicted. Such a metamodel is based on a domain 202, which is a field of action, thought, influence, or range of knowledge. Thus, a domain model 204 is a set of abstractions that describe aspects of that domain 202. A domain type 206 is a definition of an abstraction within a domain model. In the context of a document analysis system, a document may be a domain type. A domain type 206 is composed of domain fields 208 (also just referred to as fields). Domain fields 208 may be a named and (e.g., linearly) versioned attribute that can exist on one or more domain types 206. Domain fields 208 may exist in a global namespace that guarantees uniqueness and immutability such that multiple versions of a domain field 208 may exist simultaneously (e.g., as the semantics and behavior of a domain field 208 evolves). Tenants 216 can thus be associated with domain types 206 and associated domain fields 208. Domain fields 208 may, for example, vary in version by tenant 216 and domain types 206 can evolve (e.g., change) independently of their association with any given tenant 216. Stated another way, each tenant 216 may see a different view of the same domain type 206.

Figure 3A:
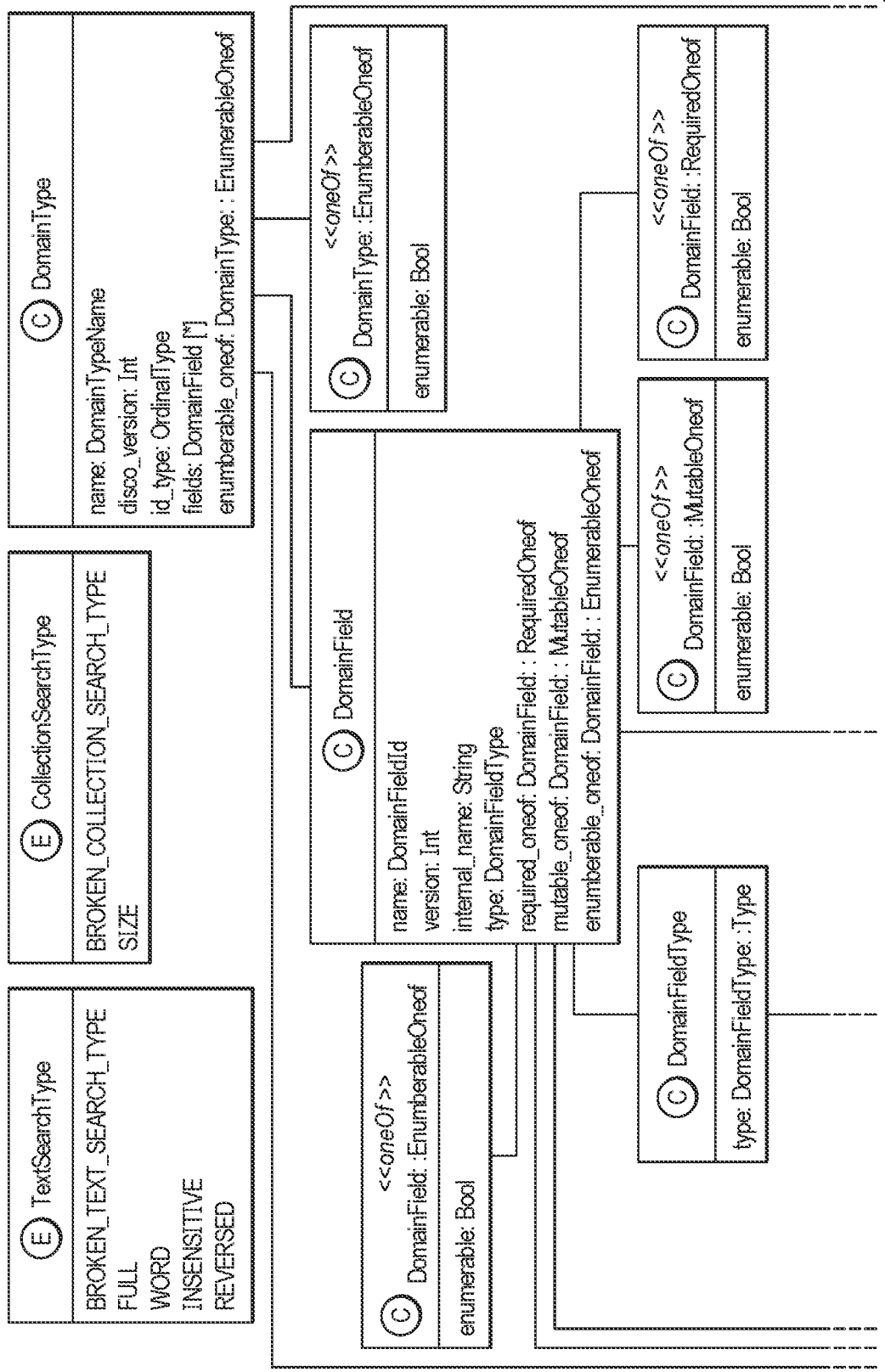
FIGS. 3A, 3B, 3C (collectively FIG. 3) and 4A, 4B, 4C and 4D (collectively FIG. 4) are block diagrams depicting embodiments of a data model that may be utilized for embodiments of a metamodel.
Figure 3B:
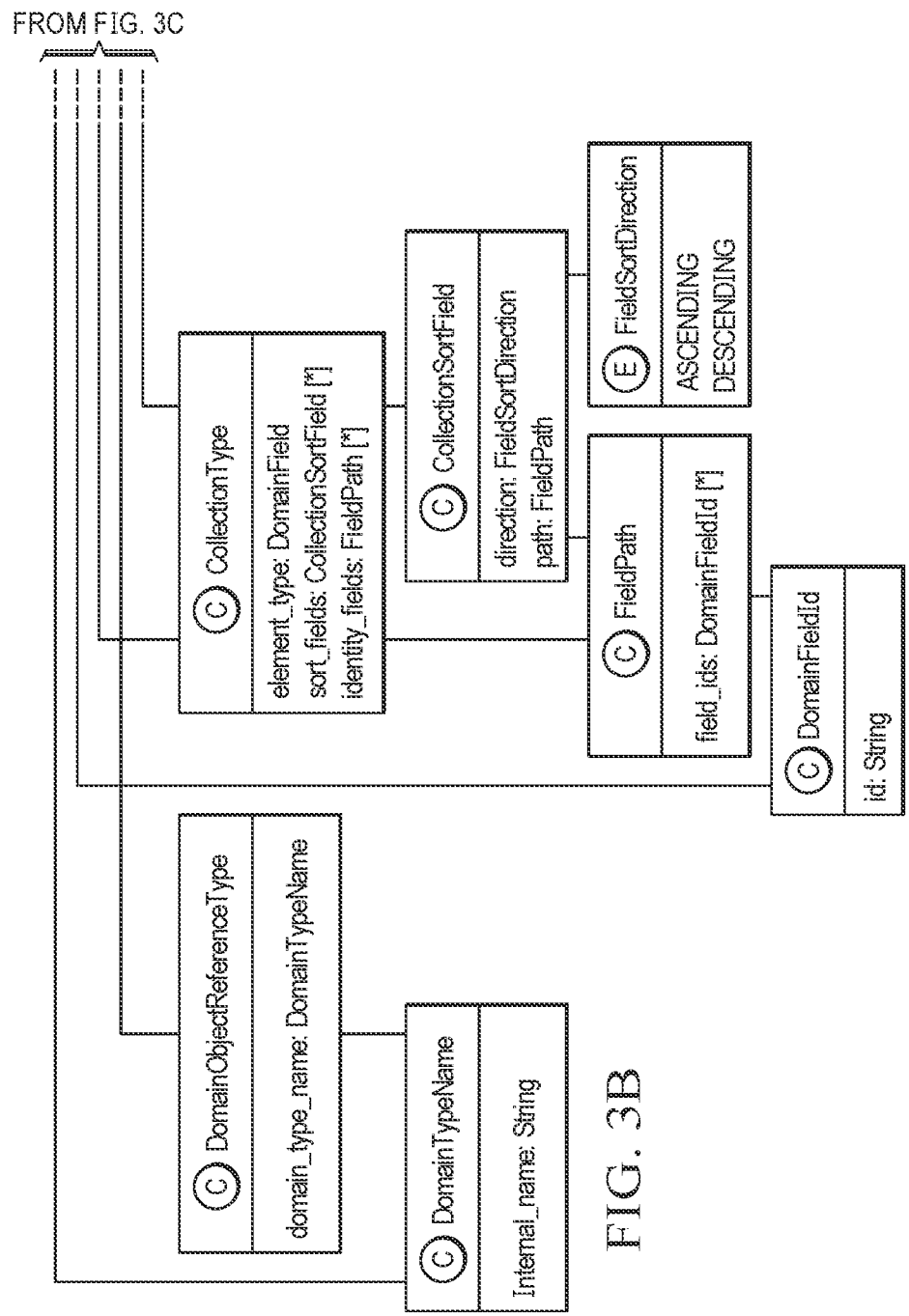
Figure 3C:
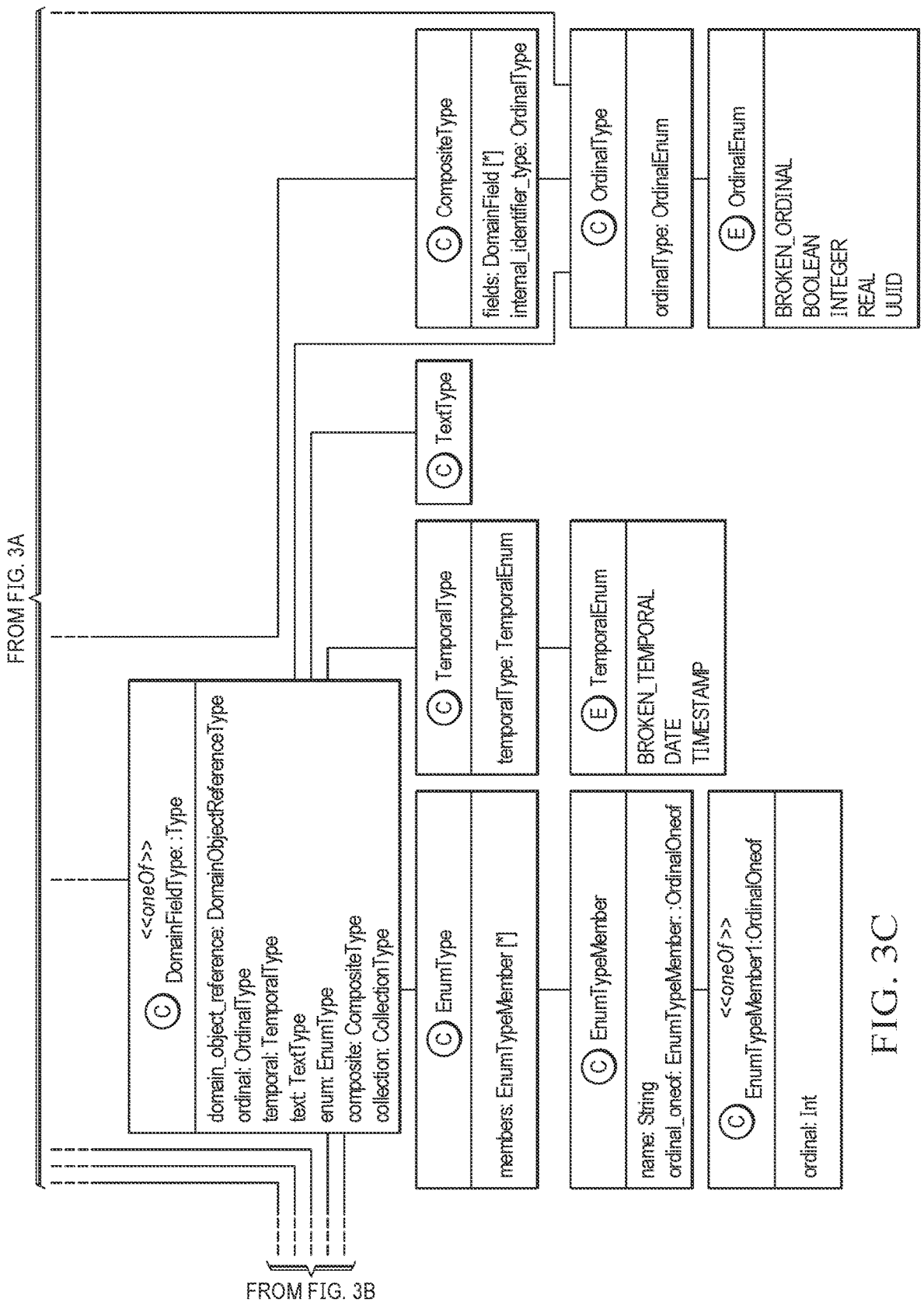
Figure 4A:
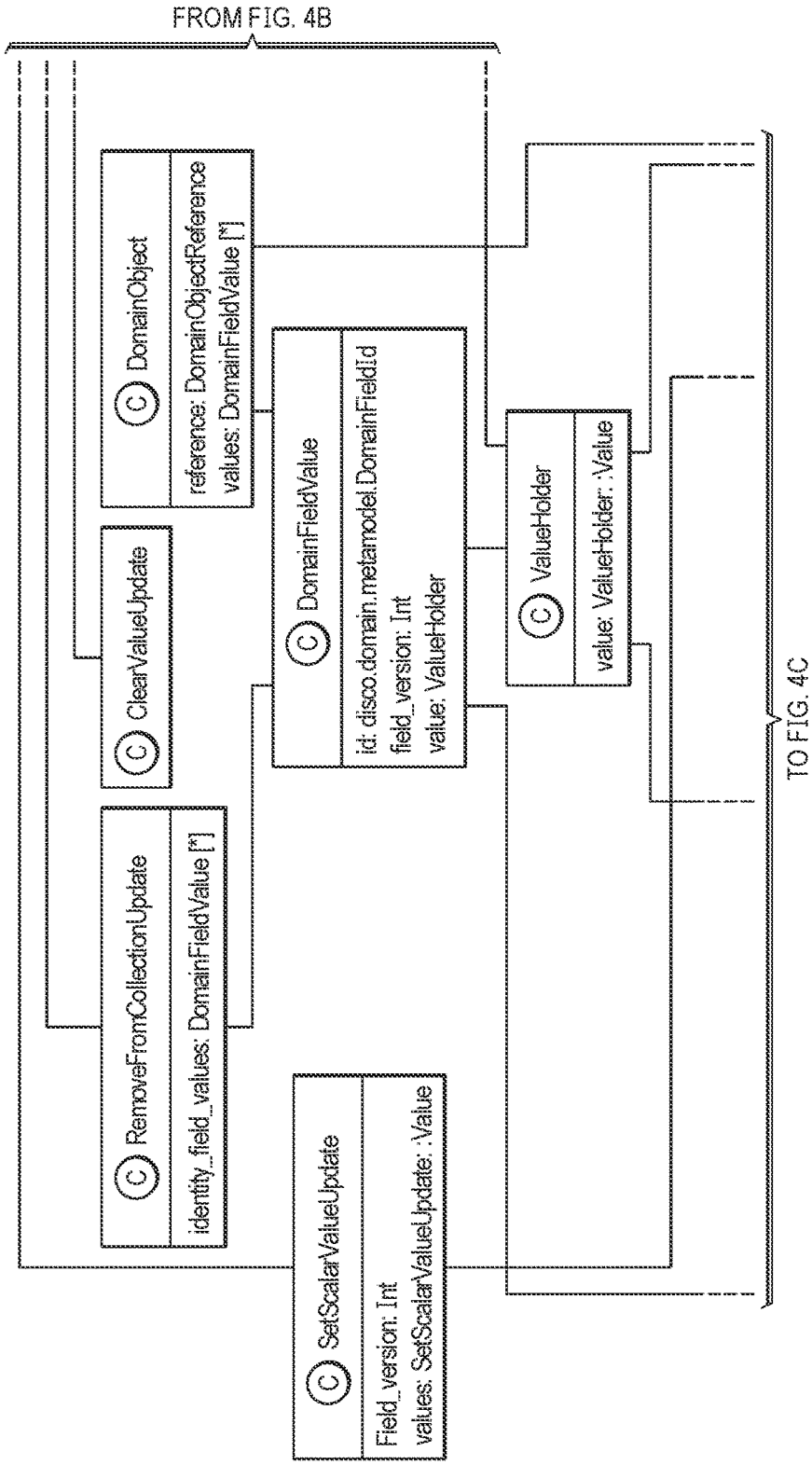
Figure 4B:
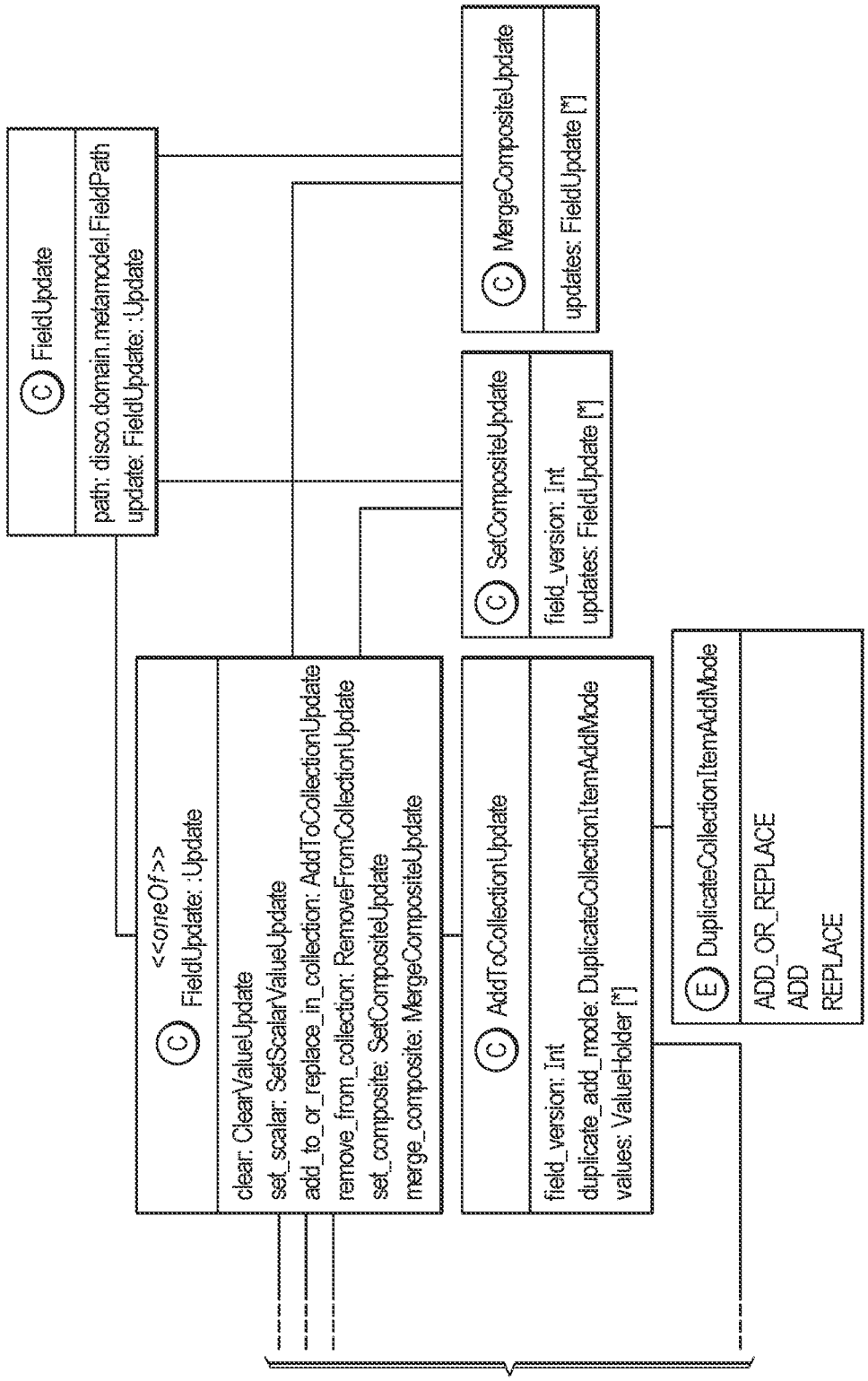
Figure 4C:
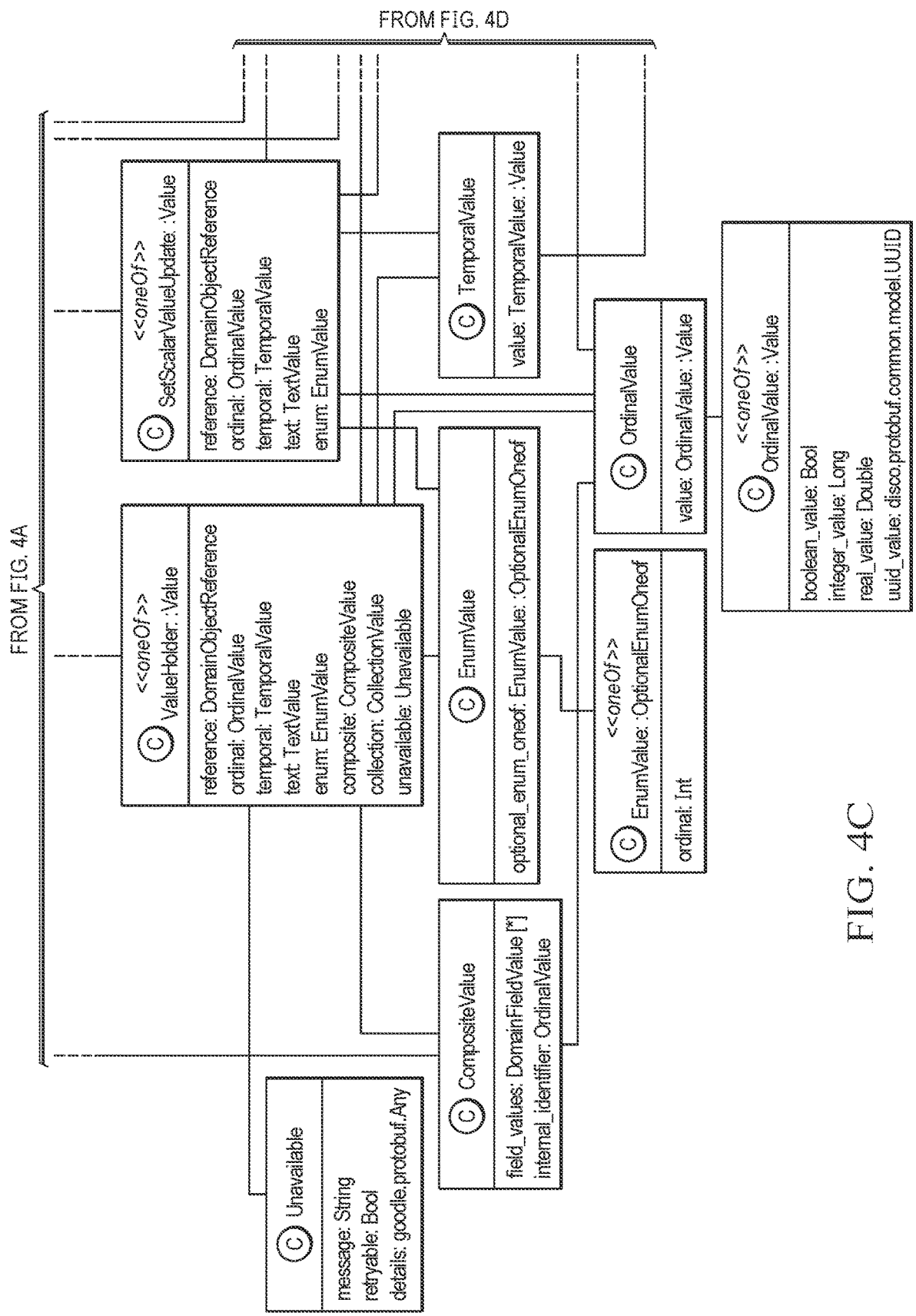
Figure 4D:
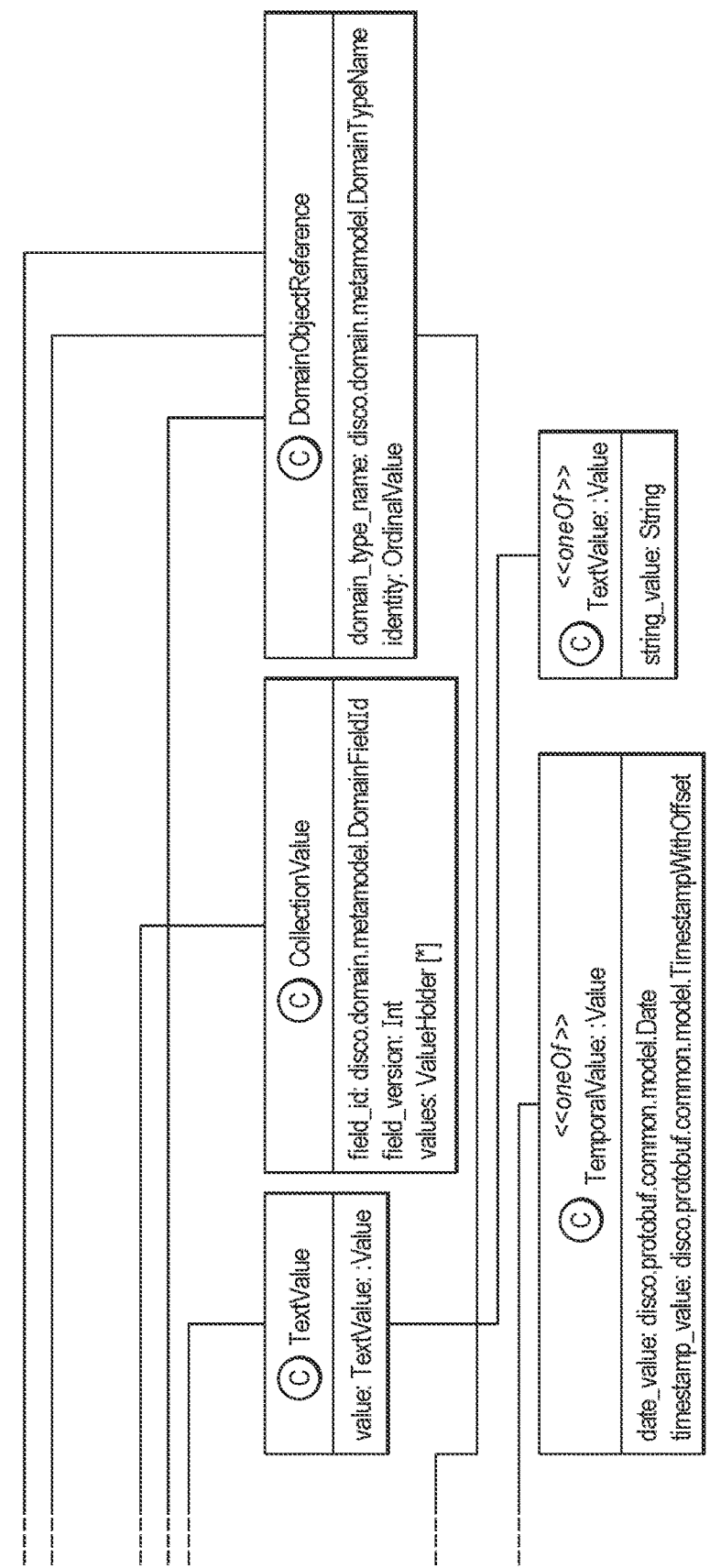

A tenant manifest 214 (also referred to as tenant domain field manifest) for a tenant 216 includes the domain types and associated domain fields and versions associated with that tenant 216. A domain object 210 may is an instance of a domain type 206 with actual field values 212 populating the (e.g., versions of) domain fields 208 that exist on that domain type 206. Particular embodiments of a data model for implementing the embodiments of the metamodel of FIG. 2 are depicted in more detail in FIGS. 3 and 4.

Returning to FIG. 1, document analysis system 101 may include a domain metadata repository 130 that includes the metamodel defining the tenant manifests 132 for each of the tenants 111 of the document analysis system 101. Specifically each tenant manifest 132 may associate one or more domain types 136 with a tenant 134 (e.g., an object or other data structure representing tenant 111). For example, a domain type 136 for the document analysis system 101 may include a document domain type 136. Instances (e.g., objects) of those domain types 136 can be individually created, associated with a corresponding identifier, and stored at the document analysis system 101 during operation of the system. To continue with the above example, instances of a document domain type 136 may include documents 107 (e.g., document objects) stored in a document store 105.

Each of those domain types 136 is associated with one or more fields 138 and in particular the version of the field 138 currently in use for that domain type 136 for that tenant 134. The field 138 associated with domain type 136 for a tenant 134 may have a unique identifier and version number such that the field 138 and version of the field 138 may be uniquely identified. In some embodiments, the field 138 may also be uniquely identified with the tenant 134 using the identifier such that the field 138, version of the field 138, domain type 136 and tenant 134 with which the field is associated may be uniquely identified based on the identifiers associated with the field 138.

In one embodiment, the tenant manifest 132 for a tenant 134 may be seeded for each domain type 136 at the time a tenant 134 is created at the document analysis system 101. Specifically, a domain type prototype 142, which is itself malleable (i.e., may be dynamically altered over time) may be used to seed a domain type 136 for a newly created tenant 134. The domain type prototype 142 comprises a definition of a set of fields 138 (e.g., and their associated versions) that should comprise the corresponding domain type 136 (e.g., a document). Accordingly, in some embodiments, when a new tenant begins to utilize the document analysis system 101, a tenant manifest 132 is created for that tenant 134 in the domain metadata repository 130. This tenant manifest 132 thus initially includes each domain type 136 associated with corresponding fields 138 (e.g., and versions of the field 138) as defined by the domain type prototype 142 for those domain types 136.

Subsequently, the tenant manifest 132 for that tenant 134 can evolve as fields are added, removed, or altered in association with each domain type 136 by either the tenant 134 (e.g., users affiliated with or acting on behalf of tenant 111 associated with tenant 134) or by document analysis system 101 (e.g., the operators of document analysis system 101 or during the course of execution of document analysis system 101). Thus, each of the set of fields 138 associated with a domain type 136 for each tenant 134 may be different (or may be the same) at different points in time.

Users associated with a tenant 111 may thus alter a field 138 to create a new version of that field 138. That new version of that field 138 may only be associated with the domain type 136 (e.g., document) for that tenant 134, even though that domain type 136 itself may be associated with multiple tenants 134. Similarly, users associated with a tenant 111 may create a custom field 138 (e.g., a field not previously defined in document analysis system 101) for a domain type 136. That custom field 138 for that tenant 111 may thus only be associated with the domain type 136 (e.g., document) for that tenant 134, even though that domain type 136 itself may be associated with multiple tenants 134. Such a custom field 138 may itself have multiple versions.

By allowing each tenant manifest 132 to thus evolve independently (e.g., allowing the fields 138 and versions of fields 138 associated with each domain type 136 to change independently of the tenant manifests 132 for other tenants 134), the meaning and composition of domain types 136 (e.g., documents) can be defined on a per-tenant 134 basis and the management and management structures for those domain types 136 (e.g., documents) can be tailored to the specific composition of those domain types 136 for each of those individual tenants 134 (representing tenants 111).

For example, fields 138 (or a version of a field 138) may be added to domain types 136 in individual tenant manifests 132 or to the definition of a domain type 136 in a domain type prototype 142 such that all new tenants 134 get that field (or both) according to a controlled deployment of that field 138. Thus, fields 138 may be deployed for use in document analysis system 101 in multiple phases if desired. In one phase (referred to as the crawl phase), a field 138 (e.g., or version for a field 138) for a domain type 136 may be added directly to the tenant manifest 132 of (one or more) individual existing tenant 134s. By adding the field 138 to only tenant manifests 132 for those individual tenants 132 the document analysis system 101 ensures that the field 138 (or version of field) is only utilized for instances of that domain type 136 associated with those tenants 134 (associated with tenants 111) going forward.

In a second phase (referred to as the walk phase) a field 138 (e.g., or versions for fields) may be added or included in the tenant manifest 132 for a domain type 136 for all new tenants (e.g., when tenant object 134 is added to represent tenant 111) that utilize the document analysis system 101 by including that field 138 in the domain type prototype 142 for that domain type 136. Thus, from that point forward (i.e., after the field 138 is added to the domain type prototype 142) when each new tenant begins to utilize the system from that point forward, the tenant manifest 132 created for that new tenant 134 will be based on the domain type prototype 142 including that field 138. As a result, the domain type 136 in the tenant manifest 132 for that new tenant will include the field 138 deployed in the walk phase (e.g., when the domain type prototype 142 is used to seed the tenant manifest 132 for that tenant 134), and instances of that domain type 136 may be processed accordingly by the components of the document analysis system 101.

In the third phase (referred to as the run phase), a field may be added directly to the tenant manifests 132 of all the existing tenants 134 (and added to the domain type prototype 142 for the domain type 136 if the field 138 was not promoted to the walk phase previously). Thus, the run phase may be undertaken similarly to the crawl phase except the group (cohort) of tenants 134 whose associated manifests are modified to include the field 138 may encompass the entirety of the tenants 134 utilizing the document analysis system 101 at that time. Here, that domain type 136 for all tenants 134 may include that field 138 from that point forward and may be processed accordingly by components 113 of the system.

Specifically, document analysis systems 101 may have a myriad number of internal or external components 113 (e.g., services or applications such as document viewers, search services for documents 107, etc.) that operate on (or facilitate operations on) documents 107 (or other instances of domain types 136). The components 113 may be responsible for performing (or facilitating the performance of) operations on documents 107 (or instances of other domain types 136) for each of the tenants 111 that utilize the document analysis system 101.

The components 113 of the document analysis system 101 that interact with instances of the domain types 136 are thus adapted to obtain the fields 138 (and versions of those fields 138) that correspond to a domain type 136 for a particular tenant 134 when (or before) processing instances of that domain type 136 for that tenant 134. By first obtaining the fields 138 that describe a domain type 138 for a particular tenant 134 the component 113 can appropriately process instances of that domain type 136 for that tenant 134 according to the fields 138 (e.g., and version of fields 138) defined for that domain type 136 for that tenant 134 (e.g., in tenant manifest 132 for that tenant 134).

To facilitate the interoperation of these components 113, or other components of the document analysis system 101, with the metamodel utilized by the document analysis system 101, embodiments of document analysis system 101 may include domain registry (also referred to as domain model registry) 140. The domain registry 140 provides a service for requesting data associated with domain types 136 and fields 138 for tenants 134. The domain registry 140 can access tenant manifests 132 in domain metadata repository 130 and return such requested data. For example, the domain registry 140 may provide an interface whereby the definitions of one or more specified domain types 136 for one or more specified tenants 134 may be requested. The domain registry 140 accesses the tenant manifest 132 in the domain metadata repository 130 for the specified tenants 134 and returns the fields 138 (and the correct versions of those fields 138) for the specified domain types 136 for those tenants 134 in response to the request.

Accordingly, components 113 may introspect (e.g., obtain) data on a domain type 136 (e.g., a document), such as fields 138 available for that domain type 136 for that tenant 134, by interacting with the domain registry 140 at the time the definition of such a domain type 136 (e.g., document domain type) is actually needed (e.g., when interacting with a document 107). The component 113 can then interact with the instance of that domain type 136 or perform other functionality (e.g., construct a display for a user, request data, etc.) based on the set of fields 138 (and versions of those fields) available for that domain type 136 for that tenant 134 at that time. Specifically, the components 113 may obtain the values for those fields 138 for a particular instance (e.g., a document 107) of that domain type 136 based on the returned set of fields 138 (and versions of those fields) and process the values for those fields 138 accordingly.

In particular, document analysis system 101 may include domain field store 103 which stores (domain) field values 109 for fields 138 associated with instances (e.g., documents 107) of domain types 136 (e.g., a document domain type). In certain embodiments, domain field store 103 may include a domain field store interface 163 comprising a service or other type of interface adapted to provide domain field values 109 for instances of domain types 136 (e.g., document) based on identifiers associated with the instance of the domain type 136 or the field 138 (or version of the field 138) for which the value 109 is desired.

The document analysis system 101 may also include a domain field broker 160 which serves as a central broker (e.g., and router) of requests for those domain field values 109 on instances of domain types 136 (e.g., documents 107). Specifically, domain field broker 160 may provide an interface whereby field values 109 associated with particular fields 138 of a particular instances (e.g., document 107) of a domain type 136 (e.g., associated with a particular tenant 134) can be requested (e.g., by components 113). This domain field broker interface may operate according to a protocol that defines the interface and the operation of requests to retrieve or update the field values 109 in the field value stores 103 through the domain field broker 160. This domain field broker 160 may also provide an interface operating according to a particular protocol (e.g., the same or a different protocol) whereby the field stores 103 can register with domain field broker 160 so the domain field broker 160 is aware of the domain field store 103 (e.g., the document types 136 or fields 138 which are stored in the domain field store 103), and which allows the domain field broker 160 to issue commands to the field stores 103 through domain field store interface 163 which may also be operating according to the same protocol.

Accordingly, once a component 113 obtains the definition of the fields 138 corresponding to a domain type 136 when processing an instance of a domain type 136 for a tenant 134, the component can obtain the actual field values 109 for any of those fields 138 for the instance of the domain type 136 by requesting such field values 109 through the domain field broker 160 (e.g., where the request identifies the instance of the domain type 136 (e.g., identifies a particular document 107). The domain field broker 160 can then obtain the requested field values 109 from the field store 103 and return them to the requesting component 113 which can process the instance of the domain type 136 accordingly.

In this manner, the definition of what a domain type (e.g., document) is (e.g., the fields that comprise a document) is not hard coded or built into components of the document analysis system that utilizes an embodiment of a metamodel as described, but is instead dynamically determined during runtime by components of the system. Thus, each individual component of the document analysis system (e.g., that processes instances of documents or other domain types for different tenants) may dynamically determine the current data model for that domain type during the runtime as individual instances of those domain types are accessed, processed, manipulated, etc. In this way, all component interactions based on domain types are driven by the metamodel comprising the individual and specific domain type definitions for the tenants of that document analysis system without requiring these components to actually be adapted to any of those tenant specific data models.

Figure 5C:
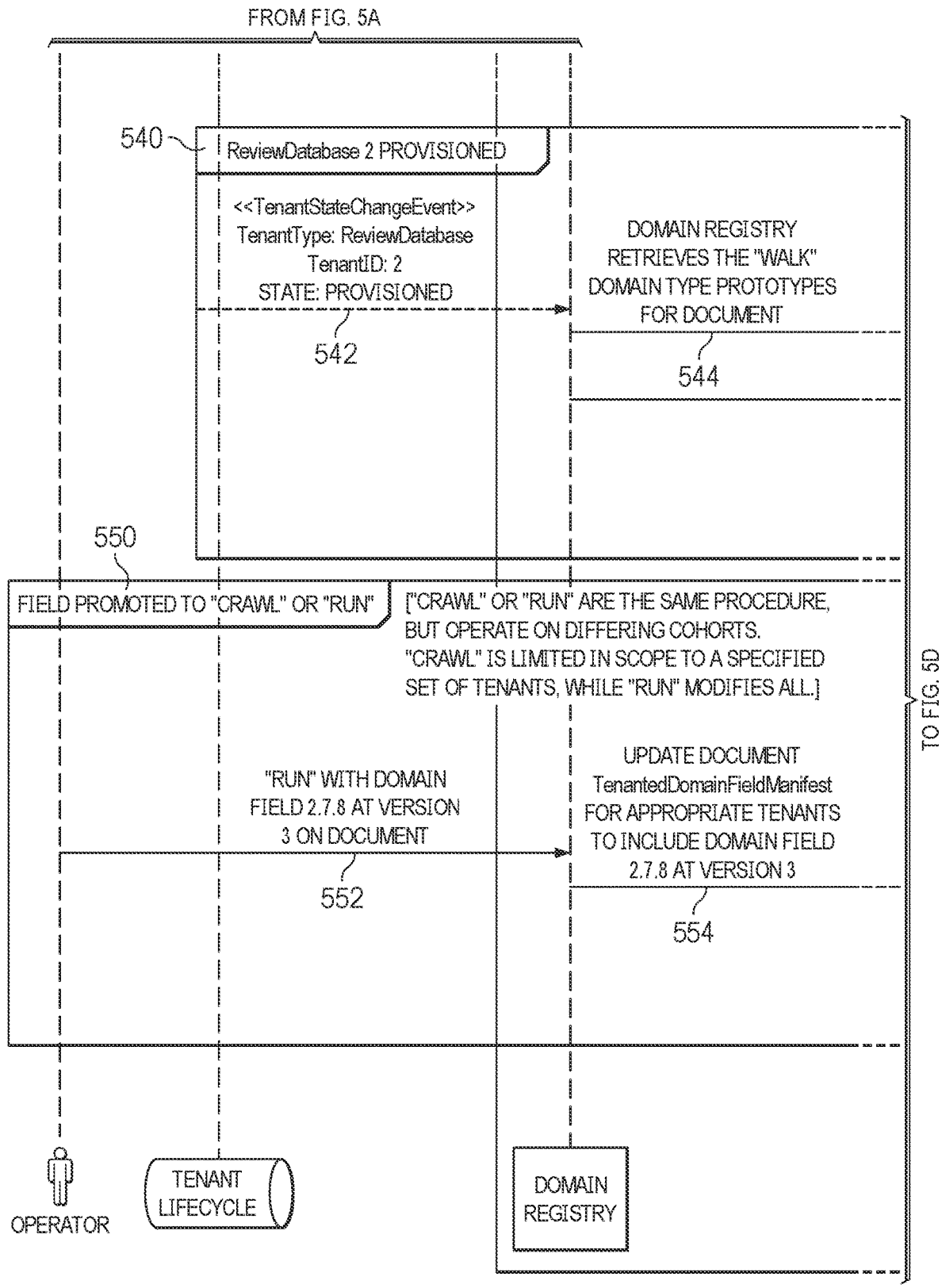
Figure 5D:
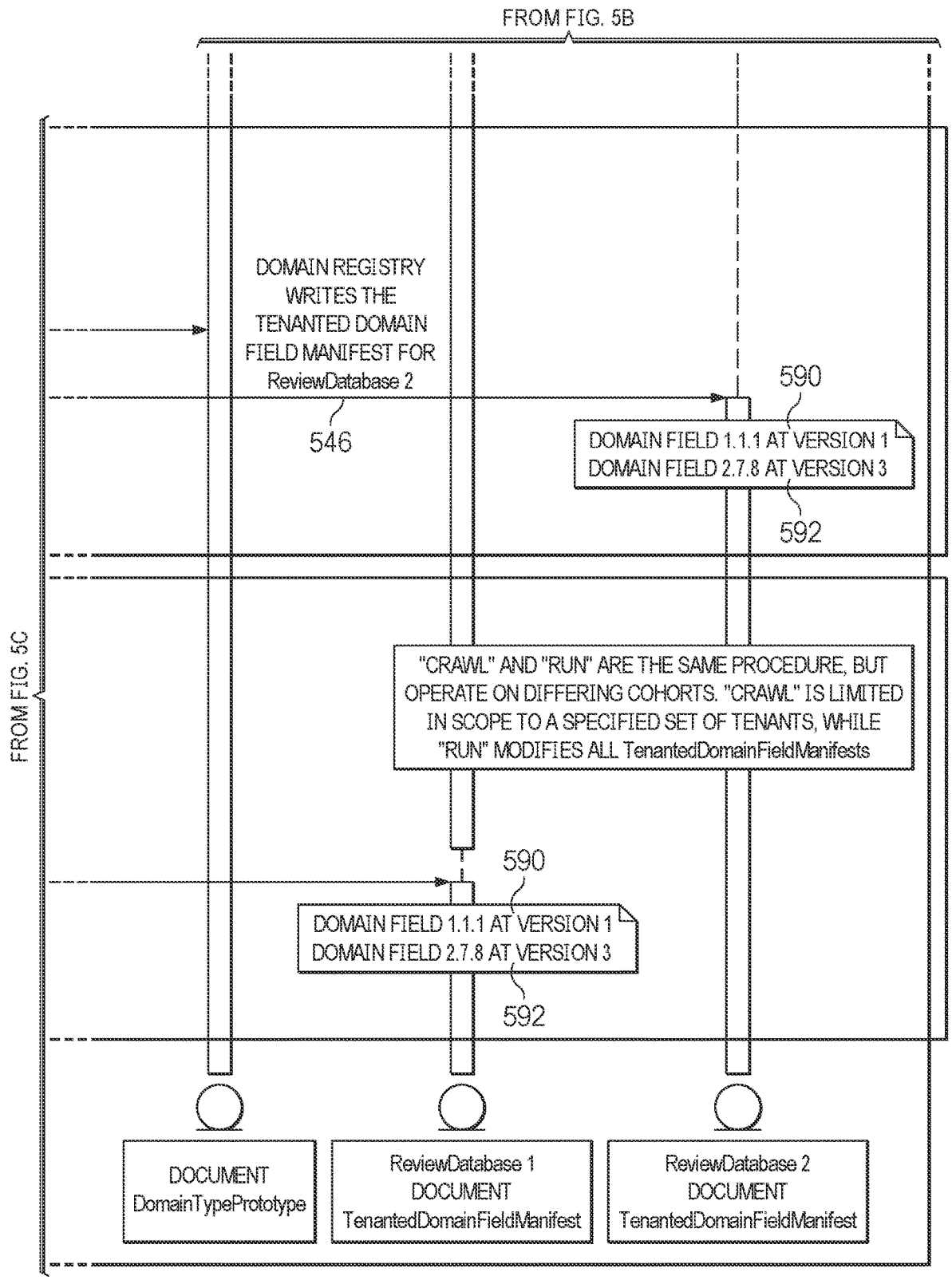

Moving now to FIG. 5, embodiments of the provisioning of tenants with domain types using a metamodel and a tenant manifest, and the associated deployment of fields for those domain types in a phased manner are depicted. For purposes of this description two tenants are depicted as two databases, "ReviewDatabase1" and "ReviewDatabase2", and the example domain type is a document. Initially, notice that domain metadata repository 510 does not include a tenant manifest for any tenants, and the domain type prototype 504 for the document domain type may include one field 590: field 1.1.1 at Version 1.

Block 520 depicts the provisioning of the tenant "ReviewDatabase1" (e.g., having TenantID 1) at a first time. Here, an event or other indication may be sent to (or otherwise obtained by) the domain registry 502 of the document analysis system indicating that the tenant "ReviewDatabase1" has been provisioned (STEP 522). When the domain registry 502 receives this event, the domain registry 502 can obtain the domain type prototype 504 for the document domain type which specifies that the document domain type includes the field 590 (field 1.1.1 at Version 1) (STEP 524). Based on that domain type prototype 504, the domain registry 502 can then update (including creating if needed) a tenant manifest 506 associated with the tenant "ReviewDatabase1" in the domain metadata repository 510 to indicate that the document data type for the tenant "ReviewDatabase1" includes the field 590 specified in the domain type prototype 504. Namely, field 1.1.1 at Version 1. Accordingly, from this point forward all documents (e.g., instances of the document data type) associated with the ReviewDatabase1 tenant will include field 590 (field 1.1.1 at Version 1) as specified in the tenant manifest 506 for ReviewDatabase1.

Block 530 depicts an embodiment of the promotion of a field to all new tenants in a walk phase. Specifically, in the example depicted in block 530, at a later point, the document analysis system may be configured such that field 592 (field 2.7.8 at Version 3) may be included for all new tenants such that the tenant manifest created for that new tenant will be based on the domain type prototype including that field. As a result, the domain type in the tenant manifest for that new tenant will include the field deployed in the walk phase (e.g., when the domain type prototype is used to seed the tenant manifest for that tenant), and instances of that domain type may be processed accordingly by the components of the document analysis system.

In particular, an operator of the document analysis system may specify that field 592 (field 2.7.8 at Version 3) is to be added to the domain type prototype 504 for the document domain type (STEP 532). In other words, the operator may promote field 592 (field 2.7.8 at Version 3) to a walk phase. Domain registry 502 may thus receive an event or other indication that the field 592 (field 2.7.8 at Version 3) is to be added to the domain type prototype 504. When domain registry 502 receives such an event, the domain registry 502 may update the domain type prototype 504 for the document domain type to include field 592: field 2.7.8 at Version 3 (STEP 534). Thus, at this point document domain type prototype 504 includes field 590 (field 1.1.1 at Version 1) and field 592 (field 2.7.8 at Version 3).

Accordingly, when a new tenant is subsequently provisioned the tenant manifest for that new tenant will include both field 590 (field 1.1.1 at Version 1) and field 592 (field 2.7.8 at Version 3). Block 540 illustrates one embodiment of just such a subsequent provisioning of a tenant. In particular block 540 depicts the provisioning of the tenant "ReviewDatabase2" (e.g., having TenantID 2) at a second time subsequent to the promotion of the field 592 (field 2.7.8 at Version 3) in a walk phase. Here, an event or other indication may be sent to (or otherwise obtained by) the domain registry 502 of the document analysis system indicating that the tenant "ReviewDatabase2" has been provisioned (STEP 542). When the domain registry 502 receives this event, the domain registry 502 can obtain the domain type prototype 504 for the document domain type which specifies that the document domain type includes the field 590 (field 1.1.1 at Version 1) and field 592 (field 2.7.8 at Version 3) (STEP 544). Based on that domain type prototype 504, the domain registry 502 can then update (including creating if needed) a tenant manifest 508 associated with the tenant "ReviewDatabase2" in the domain metadata repository 510 to indicate that the document data type for the tenant "ReviewDatabase2" includes field 590 (field 1.1.1 at Version 1) and field 592 (field 2.7.8 at Version 3). Accordingly, from this point forward all documents (e.g., instances of the document data type) associated with the ReviewDatabase2 tenant will include field 590 (field 1.1.1 at Version 1) and field 592 (field 2.7.8 at Version 3) as specified in the tenant manifest 508 for ReviewDatabase2.

Referring now to block 550, an embodiment of the promotion of a field to a run phase is depicted. It will be noted that promotion of field to a run phase may be undertaken similarly to a crawl phase for a field except the group (cohort) of tenants whose associated manifests are modified to include the field may encompass the entirety of the tenants utilizing the document analysis system for a run phase while only tenant manifests for a limited set of those tenants may be modified in a crawl phase for field.

In particular, an operator of the document analysis system may specify that field 592 (field 2.7.8 at Version 3) is to be added to all existing tenants of the document analysis system (STEP 552). In other words, the operator may promote field 592 (field 2.7.8 at Version 3) to a run phase. Domain registry 502 may thus receive an event or other indication that the field 592 (field 2.7.8 at Version 3) is to be included in the tenant manifests of all tenants of the system. When domain registry 502 receives such an event, the domain registry 502 may update the tenant manifest for those tenants that do not include field 592: field 2.7.8 at Version 3 (STEP 534). In this case, domain registry 502 updates the document domain type in tenant manifest 506 for ReviewDatabase1 with field 592 (field 2.7.8 at Version 3). Accordingly, from this point forward all documents (e.g., instances of the document data type) associated with the ReviewDatabase1 tenant will include both field 590 (field 1.1.1 at Version 1) and field 592 (field 2.7.8 at Version 3) as specified in the tenant manifest 506 for ReviewDatabase1.

Figure 6:
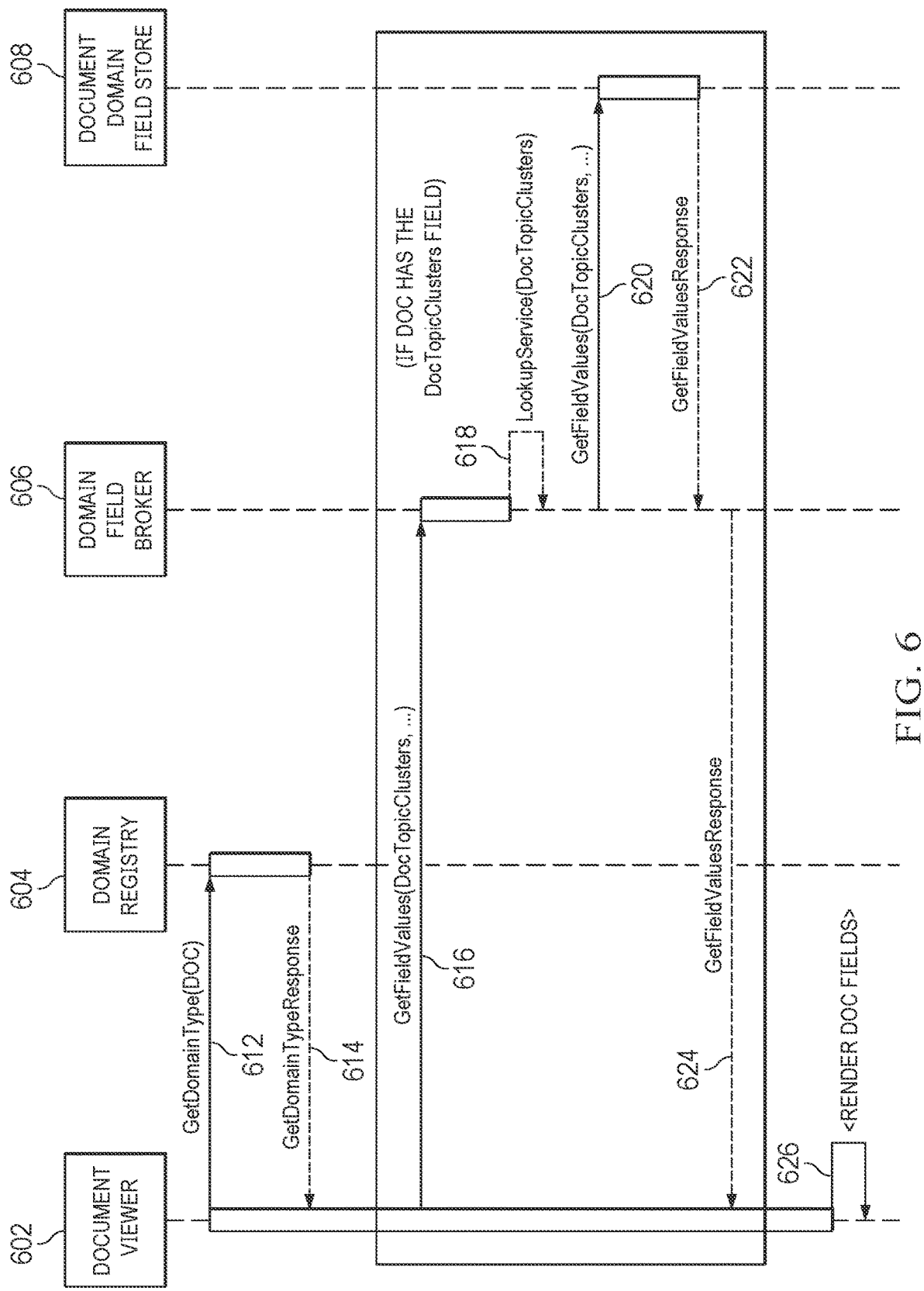
FIGS. 6 and 7 are diagrams depicting embodiments of the operation of components of a system employing a metamodel and tenant manifests for data modeling.

FIG. 6 is a diagram depicting the operation of a component of a system employing a metamodel and such tenant manifests for data modeling. Here, a component of a document analysis system may include a document viewer 602 that may for example, present a document to a user along with values for the fields of that document. Accordingly, when a user accesses a document at the document viewer 602, the document viewer 602 may make a request for the fields associated with the document domain type to the domain registry 604 (STEP 612). The request may be associated with a tenant (e.g., associated with the user). This association can be made, for example, based on a session established with the document analysis system when a user authenticates or through some other mechanism.

The domain registry 604 at the document analysis system can then determine the fields (and field versions) for the document domain type. As previously discussed, such a determination may be made based on a tenant manifest for the tenant associated with the request defining the fields associated with the domain types for that tenant. The fields identified for that document domain type for that tenant can be returned to the document viewer (STEP 614).

For fields identified in the document domain type for that tenant, the document viewer 602 may request the values for those fields for a particular document (e.g., instance of the document domain type) from the domain field broker 606 (STEP 616). In the depicted example, the field identified in the request is a "DocTopicClusters" field for the document domain type. When the domain field broker 606 receives this request, it can look up a domain field store 608 that handles the domain type (e.g., and the specified field for that domain type), which in this case is the document domain type (STEP 618). This lookup may be performed, for example, based on data stored in association with the document field broker 606 based on the registration data provided by the field stores of the document analysis system. In the example depicted, the document field broker 606 may determine that document domain field store 608 is the domain field store registered to store the document domain type and associated field values for the document domain type.

The domain field broker then sends the request for the value for the specified field for the identified document (e.g., the instance of the document domain type) to this identified domain field store 608 (STEP 620).

In response to this request the domain field store 608 returns the value for the requested field for the specified document of the document domain type (STEP 622). The domain field broker 606 returns the value for the specified field for the specified document to the document viewer 602 (STEP 624), which receives the response with the value for the field for that document and renders the field as appropriate (STEP 624).

Figure 7:
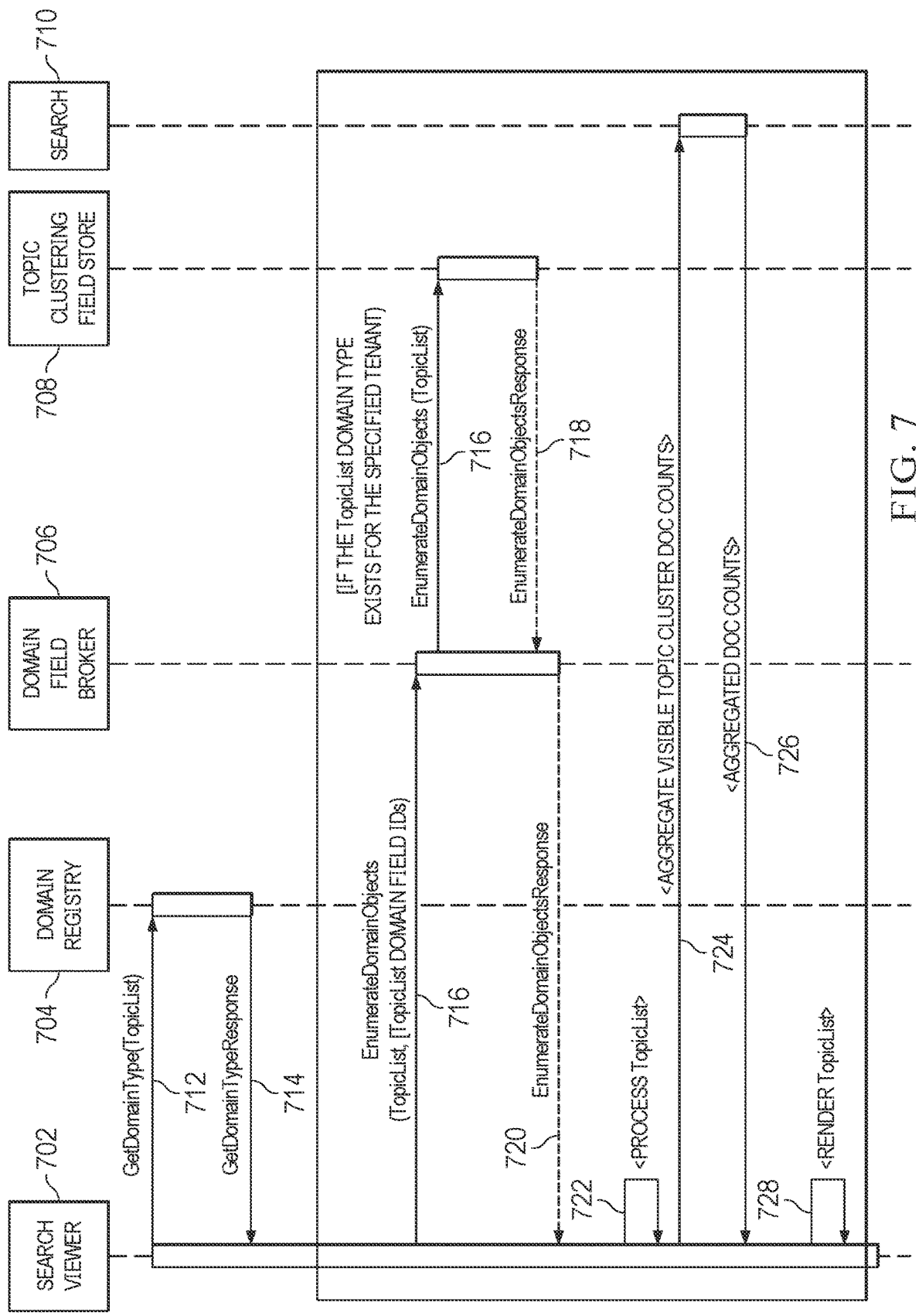

FIG. 7 is a diagram depicting another embodiment of the operation of a component of a system employing a metamodel and such tenant manifests for data modeling. In this example, a component of a document analysis system may include a search viewer 702 that as part of its functionality may for example, present values for fields for a "topic list" domain type. Accordingly, when a user utilizes the search viewer 702, the search viewer 702 may make a request for the fields associated with the topic list domain type (STEP 712). This request may be sent to the domain registry 704 at the document analysis system. The request may be associated with a tenant (e.g., associated with the user). This association can be made, for example, based on a session established with the document analysis system when a user authenticates or through some other mechanism.

The domain registry 604 at the document analysis system can then determine if topic list domain type exists for that tenant, and if so the fields (and field versions) for the topic list domain type. As previously discussed, such a determination may be made based on a tenant manifest for the tenant associated with the request defining the fields associated with the domain types for that tenant. The fields identified for that topic list domain type for that tenant can be returned to the document viewer (STEP 714).

For fields identified in the topic list domain type for that tenant, the search viewer 702 may request the values for those fields for a particular topic list instance (e.g., instance of the topic list domain type) from the domain field broker 706 (STEP 716). When the domain field broker 706 receives this request, it can lookup a domain field store 708 that handles the topic list domain type (e.g., and the specified field for that domain type). This lookup may be performed, for example, based on data stored in association with the document field broker 606 based on the registration data provided by the field stores of the document analysis system. In the example depicted, the document field broker 606 may determine that topic clustering field store 708 is the domain field store registered to store the topic list domain type and associated field values for the topic list domain type.

The domain field broker then sends the request for the value for the specified fields for the identified topic list to this identified topic clustering field store 708 (STEP 718).

In response to this request the topic clustering field store 708 returns the value for the requested field for the specified topic lists (STEP 720). The domain field broker 706 returns the value for the specified field for the specified topic list to the search viewer 702 (STEP 722), which receives the response with the value for the fields for that topic list. The search viewer can process the returned topic list to, for example, build out an internal model of the topic list utilized by the component (STEP 724). The search viewer 702 can then interact with another component of the document analysis system (e.g., in this example, search component 710) to request additional information which it may utilize to present to a user based on this internal model. For example, the search viewer 702 can request a document count for one or more topic lists (e.g., returned from the domain field broker 706) that the search viewer 702 is going to present to a user (STEP 726). The search component 710 may return the desired document counts (STEP 728) which can then be presented to the user by the search viewer (STEP 702).

Although the invention has been described with respect to specific embodiments thereof, these embodiments are merely illustrative, and not restrictive of the invention. The description herein of illustrated embodiments of the invention, including the description in the Abstract and Summary, is not intended to be exhaustive or to limit the invention to the precise forms disclosed herein. Rather, the description is intended to describe illustrative embodiments, features and functions in order to provide a person of ordinary skill in the art context to understand the invention without limiting the invention to any particularly described embodiment, feature, or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a computer communicatively coupled to a network (for example, the Internet), another computer, or in a standalone computer. As is known to those skilled in the art, a suitable computer can include a CPU, at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylus, touch pad, etc.), or the like.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods, or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps, and operations described herein can be performed in hardware, software, firmware, or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code any of the steps, operations, methods, routines, or portions thereof described herein, where such software programming or code can be stored in a computer-readable medium and can be operated on by a processor to permit a computer to perform any of the steps, operations, methods, routines, or portions thereof described herein. The invention may be implemented by using software programming or code in one or more general purpose digital computers, by using application specific integrated circuits, programmable logic devices, field programmable gate arrays, optical, chemical, biological, quantum or nanoengineered systems, components and mechanisms may be used. In general, the functions of the invention can be achieved by any means as is known in the art. For example, distributed or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system, or device. The computer readable medium can be, by way of example only but not by limitation, an electronic, magnetic, optical, electromagnetic, infrared, or semiconductor system, apparatus, system, device, propagation medium, or computer memory. Such a computer-readable medium shall generally be machine readable and include software programming or code that can be human readable (e.g., source code) or machine readable (e.g., object code). Examples of non-transitory computer-readable media can include random access memories, read-only memories, HDs, data cartridges, magnetic tapes, floppy diskettes, flash memory drives, optical data storage devices, CD-ROMs, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any hardware system, mechanism or component that processes data, signals, or other information. A processor can include a system with a general-purpose CPU, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/Figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only to those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, that follow, a term preceded by "a set", "a" or "an" (and "the" when antecedent basis is "a" or "an") includes both singular and plural of such term, unless clearly indicated otherwise (i.e., that the reference "a set", "a" or "an" clearly indicates only the singular or only the plural). Also, as used in the description herein the meaning of "in" includes "in" and "on" unless the context clearly dictates otherwise.

Although the foregoing specification describes specific embodiments, numerous changes in the details of the embodiments disclosed herein and additional embodiments will be apparent to, and may be made by, persons of ordinary skill in the art having reference to this disclosure. In this context, the specification and figures are to be regarded in an illustrative rather than a restrictive sense, and all such modifications are intended to be included within the scope of this disclosure.

What is claimed is:

1. A system, comprising:
   a processor;
   a data store storing:
      a plurality of tenant manifests, each tenant manifest associated with a corresponding one of a plurality of tenants, the plurality of tenant manifests including:
         a first tenant manifest for a first tenant, the first tenant manifest having a domain type associated with a first set of fields, and
         a second tenant manifest for a second tenant, the second tenant manifest having the domain type associated with a second set of fields; and
      values for each of the fields for each instance of the domain type, including first values for the first set of fields for a first instance of the domain type associated with the first tenant and second values for the second set of fields for a second instance of the domain type; and
   a non-transitory computer readable medium, comprising instructions for:
      in response to a first interaction with a first component in association with the first tenant: accessing the first tenant manifest, determining the first set of fields associated with the domain type, and providing the first set of fields to the first component, wherein, based on the provided first set of fields, the first component is adapted to allow interaction with instances of the domain type associated with the first tenant through the first component according to the first set of fields; and
      in response to a second interaction with the first component in association with the second tenant: accessing the second tenant manifest, determining the second set of fields associated with the domain type, and providing the second set of fields to the first component, wherein, based on the provided second set of fields, the first component is adapted to allow interaction with instances of the domain type associated with the second tenant through the first component according to the second set of fields.

2. The system of claim 1, wherein the first component or second component is a document viewer or a search client.

3. The system of claim 1, wherein at least one of the first set of fields is a customized field specific to the first tenant.

4. The system of claim 3, wherein the at least one of the first set of fields is specific to the domain type.

5. The system of claim 1, wherein allowing interaction with instances of the domain type through the first component according to the first set of fields comprises presenting an interface allowing interaction with instances of the domain type utilizing the first set of fields.

6. The system of claim 5, wherein the instructions are further for:
   in response receiving a request from the first component associated with the first tenant for the first set of fields for the first instance of the domain type, retrieving the first values for the first set of fields and returning the first values to the first component.

7. The system of claim 1, wherein the instructions are further for:
   in response to a third interaction with a second component in association with the first tenant: accessing the first tenant manifest, determining the first set of fields associated with the domain type, and providing the first set of fields to the second component, wherein, based on the provided first set of fields, the second component is adapted to allow interaction with instances of the domain type associated with the first tenant through the second component according to the first set of fields.

8. A method, comprising:
   storing a plurality of tenant manifests, each tenant manifest associated with a corresponding one of a plurality of tenants, the plurality of tenant manifests including:
      a first tenant manifest for a first tenant, the first tenant manifest having a domain type associated with a first set of fields, and
      a second tenant manifest for a second tenant, the second tenant manifest having the domain type associated with a second set of fields, and
   values for each of the fields for each instance of the domain type, including first values for the first set of fields for a first instance of the domain type associated with the first tenant and second values for the second set of fields for a second instance of the domain type;

in response to a first interaction with a first component in association with the first tenant: accessing the first tenant manifest, determining the first set of fields associated with the domain type, and providing the first set of fields to the first component, wherein, based on the provided first set of fields, the first component is adapted to allow interaction with instances of the domain type associated with the first tenant through the first component according to the first set of fields; and in response to a second interaction with the first component in association with the second tenant: accessing the second tenant manifest, determining the second set of fields associated with the domain type, and providing the second set of fields to the first component, wherein, based on the provided second set of fields, the first component is adapted to allow interaction with instances of the domain type associated with the second tenant through the first component according to the second set of fields.

9. The method of claim 8, wherein the first component or second component is a document viewer or a search client.

10. The method of claim 8, wherein at least one of the first set of fields is a customized field specific to the first tenant.

11. The method of claim 10, wherein the at least one of the first set of fields is specific to the domain type.

12. The method of claim 8, wherein allowing interaction with instances of the domain type through the first component according to the first set of fields comprises presenting an interface allowing interaction with instances of the domain type utilizing the first set of fields.

13. The method of claim 12, further comprising:
in response receiving a request from the first component associated with the first tenant for the first set of fields for the first instance of the domain type, retrieving the first values for the first set of fields and returning the first values to the first component.

14. The method of claim 8, further comprising:
in response to a third interaction with a second component in association with the first tenant: accessing the first tenant manifest, determining the first set of fields associated with the domain type, and providing the first set of fields to the second component, wherein, based on the provided first set of fields, the second component is adapted to allow interaction with instances of the domain type associated with the first tenant through the second component according to the first set of fields.

15. A non-transitory computer readable medium, comprising instructions for:
storing a plurality of tenant manifests, each tenant manifest associated with a corresponding one of a plurality of tenants, the plurality of tenant manifests including:
a first tenant manifest for a first tenant, the first tenant manifest having a domain type associated with a first set of fields, and
a second tenant manifest for a second tenant, the second tenant manifest having the domain type associated with a second set of fields; and values for each of the fields for each instance of the domain type, including first values for the first set of fields for a first instance of the domain type associated with the first tenant and second values for the second set of fields for a second instance of the domain type; and a non-transitory computer readable medium, comprising instructions for:

in response to a first interaction with a first component in association with the first tenant: accessing the first tenant manifest, determining the first set of fields associated with the domain type, and providing the first set of fields to the first component, wherein, based on the provided first set of fields, the first component is adapted to allow interaction with instances of the domain type associated with the first tenant through the first component according to the first set of fields; and in response to a second interaction with the first component in association with the second tenant: accessing the second tenant manifest, determining the second set of fields associated with the domain type, and providing the second set of fields to the first component, wherein, based on the provided second set of fields, the first component is adapted to allow interaction with instances of the domain type associated with the second tenant through the first component according to the second set of fields.

16. The non-transitory computer readable medium of claim 15, wherein the first component or second component is a document viewer or a search client.

17. The non-transitory computer readable medium of claim 15, wherein at least one of the first set of fields is a customized field specific to the first tenant.

18. The non-transitory computer readable medium of claim 17, wherein the at least one of the first set of fields is specific to the domain type.

19. The s non-transitory computer readable medium of claim 15, wherein allowing interaction with instances of the domain type through the first component according to the first set of fields comprises presenting an interface allowing interaction with instances of the domain type utilizing the first set of fields.

20. The non-transitory computer readable medium of claim 19, wherein the instructions are further for:
in response receiving a request from the first component associated with the first tenant for the first set of fields for the first instance of the domain type, retrieving the first values for the first set of fields and returning the first values to the first component.

21. The non-transitory computer readable medium of claim 15, wherein the instructions are further for:
in response to a third interaction with a second component in association with the first tenant: accessing the first tenant manifest, determining the first set of fields associated with the domain type, and providing the first set of fields to the second component, wherein, based on the provided first set of fields, the second component is adapted to allow interaction with instances of the domain type associated with the first tenant through the second component according to the first set of fields.

* * * * *